(12) United States Patent
Davis et al.

(10) Patent No.: US 9,380,220 B2
(45) Date of Patent: Jun. 28, 2016

(54) OPTICAL FILTERING FOR CAMERAS

(71) Applicant: RED.COM, Inc., Irvine, CA (US)

(72) Inventors: Anthony Wayne Davis, Los Alamos, NM (US); Robert Rose, Trabuco Canyon, CA (US); Thomas Graeme Nattress, Acton (CA); Peter Jarred Land, Los Angeles, CA (US); James H. Jannard, Las Vegas, NV (US)

(73) Assignee: RED.COM, INC., Irvine, CA (US)

( * ) Notice: Subject to any disclaimer, the term of this patent is extended or adjusted under 35 U.S.C. 154(b) by 28 days.

(21) Appl. No.: 14/244,764

(22) Filed: Apr. 3, 2014

(65) Prior Publication Data

US 2014/0300805 A1  Oct. 9, 2014

Related U.S. Application Data

(60) Provisional application No. 61/882,575, filed on Sep. 25, 2013, provisional application No. 61/877,459, filed on Sep. 13, 2013, provisional application No. 61/809,260, filed on Apr. 5, 2013.

(51) Int. Cl.
  *H04N 5/238* (2006.01)
  *H04N 5/225* (2006.01)

(52) U.S. Cl.
  CPC .............. *H04N 5/238* (2013.01); *H04N 5/2254* (2013.01)

(58) Field of Classification Search
  CPC ......... H04N 5/238; H04N 5/2254; G03B 9/08
  See application file for complete search history.

(56) References Cited

U.S. PATENT DOCUMENTS

| | | | |
|---|---|---|---|
| 1,800,057 A | 12/1928 | Donle | |
| 2,062,960 A | 9/1930 | Berggren | |
| 2,351,932 A | 6/1944 | Deckel et al. | |
| 2,514,302 A | 7/1950 | Aiken | |
| 3,270,646 A | 9/1966 | Wilson | |
| 4,812,911 A * | 3/1989 | Ohshima | H04N 5/2254 348/265 |
| 4,889,424 A | 12/1989 | Saiki | |
| 5,063,450 A | 11/1991 | Pritchard | |
| 5,371,655 A | 12/1994 | Murdock et al. | |

(Continued)

FOREIGN PATENT DOCUMENTS

KR   10-2008-0048113   6/2008

OTHER PUBLICATIONS

Fuchs et al., "A Shaped Temporal Filter Camera," VMV 2009, http://www.mpi-inf.mpg.de/resources/stfcamera/stfcamera.pdf, in 10 pages, accessed on Feb. 6, 2014.

(Continued)

*Primary Examiner* — Twyler Haskins
*Assistant Examiner* — Peter Chon
(74) *Attorney, Agent, or Firm* — Knobbe, Martens, Olson & Bear LLP

(57) ABSTRACT

In one embodiment, a camera includes an image sensor within a camera housing that converts light entering the camera housing through an optical filter into digital image data. The optical filter can have a variable opacity. A processor in communication with the image sensor identifies operation settings for the optical filter and adjusts an opacity level of the optical filter over an exposure period in accordance with the operation settings for the optical filter. In addition, the processor modifies values of the digital image data based at least on the operation settings for the optical filter.

27 Claims, 11 Drawing Sheets

(56) References Cited

U.S. PATENT DOCUMENTS

| | | | |
|---|---|---|---|
| 5,619,266 A | 4/1997 | Tomita et al. | |
| 5,691,830 A | 11/1997 | Dickson et al. | |
| 5,850,277 A | 12/1998 | Dang et al. | |
| 5,956,044 A | 9/1999 | Giorgianni et al. | |
| 6,040,857 A | 3/2000 | Hirsh et al. | |
| 6,088,058 A | 7/2000 | Mead et al. | |
| 6,115,556 A | 9/2000 | Reddington | |
| 6,330,400 B1 | 12/2001 | Bittner et al. | |
| 6,456,345 B1 | 9/2002 | Ise | |
| 6,720,742 B2 | 4/2004 | Yanagida et al. | |
| 6,731,339 B2 | 5/2004 | Ohkawara | |
| 6,791,657 B2 | 9/2004 | Yanagida et al. | |
| 6,804,037 B1 | 10/2004 | Nito et al. | |
| 6,876,412 B2 | 4/2005 | Udaka et al. | |
| 6,930,723 B1 | 8/2005 | Tsuda et al. | |
| 6,961,089 B2 | 11/2005 | Kubo | |
| 7,057,683 B2 | 6/2006 | Udaka et al. | |
| 7,110,155 B2 | 9/2006 | Nito et al. | |
| 7,212,234 B2 | 5/2007 | Sakaguchi et al. | |
| 7,230,598 B2 | 6/2007 | Kawabata et al. | |
| 7,245,363 B2 | 7/2007 | Mushika | |
| 7,339,649 B2 | 3/2008 | Imai et al. | |
| 7,394,498 B2 | 7/2008 | Takaoka | |
| 7,428,378 B1* | 9/2008 | Warpakowski Furlan | G03B 7/16 348/370 |
| 7,483,116 B2 | 1/2009 | Udaka | |
| 7,492,409 B2 | 2/2009 | Yanagida | |
| 7,564,019 B2 | 7/2009 | Olsen et al. | |
| 7,573,524 B2 | 8/2009 | Tsuji et al. | |
| 7,612,805 B2 | 11/2009 | Solomon | |
| 7,633,563 B2 | 12/2009 | Ohishi et al. | |
| 7,639,294 B2 | 12/2009 | Ito | |
| 7,705,883 B2 | 4/2010 | Stavely et al. | |
| 7,755,678 B2 | 7/2010 | Goris et al. | |
| 7,764,322 B2 | 7/2010 | He et al. | |
| 7,924,321 B2* | 4/2011 | Nayar | H04N 5/2355 348/221.1 |
| 7,948,538 B2 | 5/2011 | Asoma | |
| 7,978,239 B2 | 7/2011 | Deever et al. | |
| 8,004,619 B2 | 8/2011 | Ohishi et al. | |
| 8,040,425 B2 | 10/2011 | Shibuya et al. | |
| 8,228,418 B2 | 7/2012 | Pillman et al. | |
| 8,237,830 B2 | 8/2012 | Jannard et al. | |
| 8,319,866 B2 | 11/2012 | Yamano | |
| 8,437,083 B2 | 5/2013 | Sano | |
| 8,508,608 B2 | 8/2013 | Bub | |
| 8,520,083 B2 | 8/2013 | Webster et al. | |
| 8,525,924 B2 | 9/2013 | Jannard | |
| 8,525,925 B2 | 9/2013 | Jannard | |
| 8,648,899 B2 | 2/2014 | Henkinet et al. | |
| 2001/0012067 A1 | 8/2001 | Spitzer et al. | |
| 2003/0052989 A1* | 3/2003 | Bean | H04N 5/238 348/362 |
| 2004/0130649 A1 | 7/2004 | Lee | |
| 2004/0201707 A1 | 10/2004 | Noguchi et al. | |
| 2004/0223075 A1* | 11/2004 | Furlan | H04N 5/2254 348/363 |
| 2004/0233308 A1 | 11/2004 | Elliott et al. | |
| 2005/0024489 A1 | 2/2005 | Fredlund et al. | |
| 2005/0046703 A1 | 3/2005 | Cutler | |
| 2006/0192879 A1 | 8/2006 | Hisamatsu | |
| 2007/0257184 A1 | 11/2007 | Olsen et al. | |
| 2007/0263118 A1 | 11/2007 | Sato et al. | |
| 2008/0002029 A1 | 1/2008 | He et al. | |
| 2008/0055454 A1 | 3/2008 | Yumiki | |
| 2008/0158372 A1 | 7/2008 | Palum et al. | |
| 2008/0239104 A1 | 10/2008 | Koh | |
| 2008/0278621 A1 | 11/2008 | Cho et al. | |
| 2008/0303927 A1 | 12/2008 | Khanh | |
| 2009/0059101 A1 | 3/2009 | Wang et al. | |
| 2009/0096915 A1 | 4/2009 | Kelly et al. | |
| 2009/0180009 A1 | 7/2009 | Kanade et al. | |
| 2009/0190918 A1 | 7/2009 | Chang | |
| 2009/0213233 A1 | 8/2009 | Kido | |
| 2009/0268075 A1 | 10/2009 | Yumiki | |
| 2010/0033604 A1 | 2/2010 | Solomon | |
| 2010/0157082 A1 | 6/2010 | Katerberg | |
| 2011/0254998 A1 | 10/2011 | Bourdon et al. | |
| 2012/0062845 A1 | 3/2012 | Davis et al. | |
| 2012/0114325 A1 | 5/2012 | Take et al. | |
| 2012/0120282 A1 | 5/2012 | Goris | |
| 2012/0268578 A1 | 10/2012 | Vertikov et al. | |
| 2013/0188074 A1* | 7/2013 | Nakabayashi | H04N 5/238 348/223.1 |

OTHER PUBLICATIONS

M. Fuchs, T. Chen, O. Wang, R. Raskar, H-P. Seidel, H. Lensch; A Shaped Temporal Filter Camera; technical reports of the Max-Planck-Institut fur Informatik; MPI-I-2009-4-003 Jun. 2009; Germany. see http://www.visus.uni-stuttgart.de/~fuchsmn/publications/RR-AShapedTemporalFilterCamera.300dpi.pdf.

International Search Report and Written Opinion for PCT Application No. PCT/US2011/035495 mailed Jan. 3, 2014, in 14 pages.

D. Purves, J. Paydarfar, T. Andrews; The Wagon Wheel Illusion in Movies and Reality; Proc. Natl. Acad. Sci. USA; Apr. 1996; pp. 3693-3697; vol. 93; PNAS, Washington, DC, USA.

R. Raskar, A. Agrawal, J. Tumblin; Coded Exposure Photography: Motion Deblurring using Fluttered Shutter; ACM Transactions on Graphics (TOG)—Proceedings of ACM SIGGRAPH 2006, vol. 25 Issue 3, Jul. 2006, pp. 795-804, New York, NY, USA.

Shechtman et al., "Increasing Space-Time Resolution in Video," ECCV 2002, LNCS 2350, pp. 753-768, 2002.

International Search Report and Written Opinion for Application No. PCT/US2014/032871, mailed Aug. 14, 2014, in 10 pages.

* cited by examiner

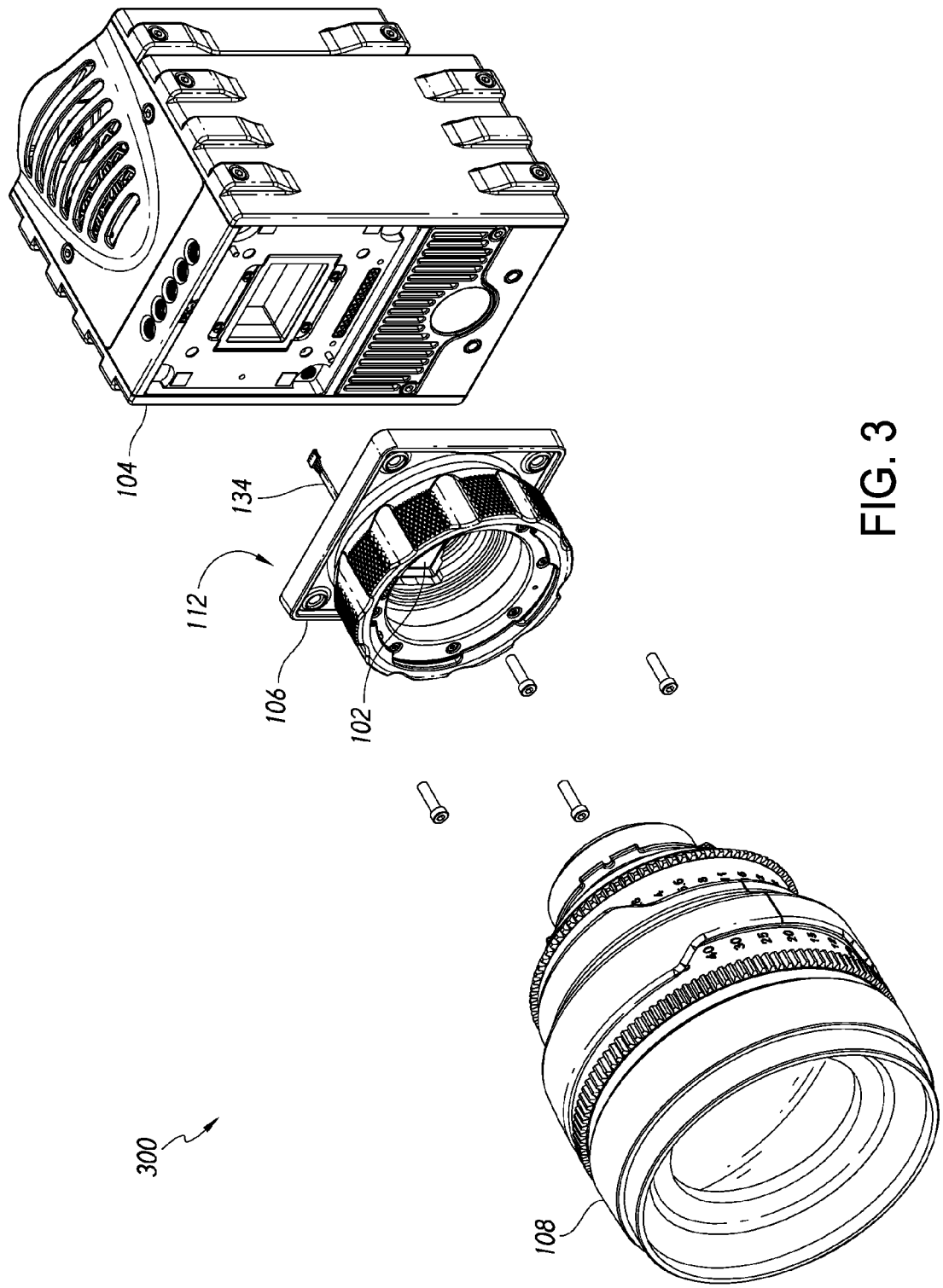

OPTICAL FILTERING FOR CAMERAS

REFERENCE TO RELATED APPLICATIONS

The present application claims priority benefit from U.S. Provisional Application No. 61/809,260, filed Apr. 5, 2013, entitled "OPTICAL FILTERING FOR CAMERAS," U.S. Provisional Application No. 61/877,459, filed Sep. 13, 2013, entitled "OPTICAL FILTERING AND EXPOSURE CONTROL FOR CAMERAS," and U.S. Provisional Application No. 61/882,575, filed Sep. 25, 2013, entitled "OPTICAL FILTERING FOR CAMERAS;" the disclosures of which are incorporated herein by reference in their entirety.

BACKGROUND

Motion picture film cameras expose film by allowing light to pass through a lens opening and then through a shutter aperture. In traditional motion picture cameras, a shutter rotates at a speed synchronous with that of passing film frames. Digital motion picture cameras, on the other hand, expose an image sensor by electronically controlling an exposure time for each frame to achieve a similar effect.

SUMMARY

According to certain aspects, an optical filter (e.g., an electronically controlled, variable opacity filter) and corresponding methods are provided for neutral density filtering, temporal filtering, or both. The optical filter can be integrated with an existing camera component, such as a lens mount or camera body, providing seamless integration of the optical filter with a camera system.

According to certain aspects, a camera is provided that includes a housing and an image sensor within the housing and configured to convert light entering the housing into digital image data. The camera includes a variable opacity optical filter positioned along an optical path between a point outside of the camera body and the image sensor. A variable opacity of the optical filter may be electronically controlled.

The variable opacity optical filter can be positioned along the optical path between a lens supported by the camera and the image sensor. For instance, in some cases, a lens mount includes the variable opacity optical filter and is releasably attachable to the housing. The lens mount is configured to accept a lens assembly. Integrating the optical filter in the lens mount can provide certain benefits over positioning the filter in other locations. For instance, where a common lens mount can cooperate with a variety of third party lenses, users can purchase a single component giving them the ability to use the optical filter functionality with any compatible lens, in contrast to situations where the filter is integrated within the lens, for example. Moreover, unlike configurations where the optical filter is housed in a separate packaging and attached to the front of the lens, the lens mount-integrated optical filter allows a user to interchange lenses without having to also detach the optical filter from the old lens and attach it to the new lens. Since lenses are typically interchanged frequently, much more frequently than lens mounts, for example, this can greatly simplify use. Finally, while in some embodiments the lens mount can be included within the camera body, inclusion of the optical filter in the lens mount reduces the number of components included in the camera housing and provides enhanced flexibility. For instance, a user can elect to record with or without the optical filter by selection of a lens mount that includes or does not include the optical filter, as desired. Or in some cases a common lens mount including the optical filter can be used with multiple different types of compatible camera bodies. In certain other embodiments, the variable opacity optical filter is positioned within the housing. In yet other embodiments, the optical filter can be located within the lens, is attached to or otherwise situated in front of the lens in the optical path, or is located at some other location in the optical path.

In certain embodiments, the housing includes a housing aperture, and the lens mount is attachable to the housing aperture, wherein the variable opacity optical filter is positioned within the housing and between the housing aperture and the image sensor.

The variable opacity optical filter can include liquid crystal, for example one or more liquid crystal panels.

In certain embodiments, the variable opacity optical filter is configured to operate in a neutral density mode. In the neutral density mode, the opacity of the variable opacity optical filter can be substantially constant, e.g., while the image sensor is exposed.

The variable opacity optical filter can also be configured to operate in a temporal filtering mode. When in the temporal filtering mode, the variable opacity optical filter can vary according to a temporal filtering function during at least a portion of a frame period.

The camera can be configured to store a plurality of frames of a video recording, and when in the temporal filtering mode, an attenuation coefficient of the variable opacity optical filter can change from a first attenuation coefficient to at least a second attenuation coefficient (e.g., to a plurality of other attenuation coefficients), according to the temporal filtering function, wherein the first attenuation coefficient is different from the second attenuation coefficient, during at least a portion of an exposure of a single frame of a video recording captured by the camera. For instance, the variable opacity of the variable opacity optical filter may substantially continually vary according to the temporal filtering function during the exposure.

The camera can also include an opacity controller, the opacity controller being configured to electronically control the variable opacity optical filter, wherein, when in the temporal filtering mode, the variable opacity optical filter varies according to a temporal filtering function. The opacity controller, in some cases, is configured to transmit a first control signal to the variable opacity optical filter causing the variable opacity optical filter to change its opacity to the first attenuation coefficient and to transmit a second control signal control to the variable opacity optical filter causing the variable opacity optical filter to change its opacity to the second attenuation coefficient.

The variable opacity optical filter can be configured to reduce temporal aliasing when operating in the temporal filtering mode. And, the variable opacity optical filter can be configured to selectively operate in one or more of a neutral density filtering mode, a temporal filtering mode, and a global shuttering mode.

According to some embodiments, the camera can include at least one processor within the housing configured to process the digital image data generated by the image sensor and modify values of the digital image data based on a configuration of the optical filter. For example, the processor can be configured to vary the amount of modification to the values of the digital image data based on an opacity setting for the variable opacity optical filter. The opacity setting may correspond to a user-selected neutral density stop setting for the variable opacity optical filter.

The digital image data, in some cases, includes first, second, and third colors, and the processor is configured to modify values for the first color based on the opacity setting. The first color can be blue image data, for example. The modification of the values may counteract a color shift of the digital image data caused by the optical filter.

When the variable opacity optical filter operates in a temporal filtering mode, the processor may modify the values based at least in part on a shutter angle associated with the variable opacity optical filter. The modification of the values that is based at least in part on the shutter angle may adjust a white point of the digital image data. And, the modification of the values can counteract a white point shift in the digital image data caused by the variable opacity optical filter.

The processor can be configured, in some embodiments, to modify values of the digital image data according to a first function to counteract a white point shift caused by the variable opacity optical filter and to modify values of the digital image data according to a second function to counteract a color shift caused by the variable opacity optical filter.

According to further aspects, the camera can include at least one processor configured to control operation of the sensor and to generate a synchronization or other control signal. In addition, the variable opacity optical filter can comprise drive electronics configured to control the opacity of the variable opacity optical filter, receive the signal, and in response to the signal, synchronize the control of the opacity of the variable opacity optical filter with operation of the image sensor.

The synchronization or control signal can be routed from the processor to the drive electronics via a signal path that is internal to the camera in some cases. For instance, the signal can be routed from the processor to the drive electronics of the variable opacity optical filter without the use of an external camera port or leads or cables external to the camera.

According to additional aspects, the variable opacity optical filter can be configured to be selectively mechanically moved into and out of the optical path. In such cases, the camera can include a substitute optical element configured to mechanically move into the optical path in place of the variable opacity optical filter when the variable opacity optical filter is moved out of the optical path. The camera can include an actuator actuatable by a user to effect the movement of the variable opacity optical filter into and out of the optical path. The substitute optical element can include substantially transparent material, such as glass. Moreover, the substitute optical element, in some cases, has an index of refraction substantially similar to the variable opacity optical filter.

The camera can additionally include at least a first electronic connector connecting the drive electronics with the variable opacity optical filter, first electronic connector having at least one flexible portion. The first electronic connector can include at least two electrical conductors, both of which can be connected to both the drive electronics and the variable opacity optical filter. The first electronic connector may be arranged such that no portion of the first flexible electronic connector passes through the optical path as the variable opacity optical filter moves into and out of the optical path.

In some additional embodiments, the camera can include a second image sensor within the housing and configured to convert light entering the housing into digital image data, and a second variable opacity optical filter positioned along the optical path between a second lens assembly supported by the housing and the second image sensor, wherein a variable opacity of the second variable opacity optical filter is electronically controlled.

The camera can additionally include an iris diaphragm disposed in the optical path between the point outside of the camera body and the image sensor. The iris diaphragm can include a diaphragm mechanism configured to define an adjustable-size aperture stop of the optical path.

In some embodiments, the camera can include an exposure controller configured to adjust an exposure level at least partly by changing at least one optical characteristic of the optical filter. The at least one optical characteristic can be an opacity of the optical filter. The exposure controller can adjust the at least one optical characteristic in response to changes in lighting conditions external to the camera or in the current field of view of the camera. The exposure controller can additionally or alternatively adjust the at least one optical characteristic in response to processing of the digital image data captured by the sensor. The exposure controller can change the at least one optical characteristic while one or two or more of or each of (i) the size of the aperture-stop, (ii) an adjustable shutter speed of the camera, (iii) an adjustable sensitivity of the image sensor, (iv) a white balance setting of the camera, or (v) a depth of field of the camera are maintained substantially constant or not modified. The exposure controller can adjust the at least one optical characteristic in order to maintain the exposure level at a substantially constant level or within a pre-determined range. The range may be within a range of plus or minus no more than about 1% or about 5% of a baseline exposure level. The exposure controller can adjust the at least one optical characteristic in response to changes in lighting conditions detected by a second sensor separate from the image sensor. The second sensor can be a second image sensor.

A mechanical shutter can, in addition, be positioned between the point outside the point outside the camera and the image sensor in the optical path.

In certain embodiments, the image sensor can implement an electronic shutter. When the image sensor implements the electronic shutter, the shutter speed of the camera can be associated with the electronic shutter implemented by the image sensor.

A focusing mechanism can additionally be disposed in the optical path comprising at least one lens assembly configured to adjust a focus of light flowing through the focusing mechanism to the image sensor.

In an embodiment, a camera can include a camera housing, an image sensor within the camera housing, and a processor in communication with the image sensor. The image sensor can convert light entering the camera housing into digital image data. The light can pass through a variable opacity optical filter situated in the optical path prior to arriving at the image sensor. The processor can identify operation settings for the optical filter, generate control information that causes an opacity level of the optical filter to adjust over an exposure period in accordance with the operation settings for the optical filter, and modify values of the digital image data based at least on the operation settings for the optical filter.

The camera of the preceding paragraph can include one or more of the following features: When the operation settings for the optical filter indicate a temporal filtering mode, the processor can generate the control information that causes the opacity level of the optical filter to adjust over the exposure period from a first opacity level to a second opacity level and back to the first opacity level, and the opacity level can transition through a plurality of intermediate opacity levels when adjusting between the first opacity level and the second opacity level and when adjusting between the second opacity level and the first opacity level. The operation settings for the optical filter can include a neutral density setting, and the processor can maintain the opacity level of the optical filter over the exposure period at an opacity level corresponding to the neutral density setting. The processor can modify the values of the digital image data by applying a matrix to the digital image data to at least counteract an effect of the optical filter on the digital image data. The processor can modify the values of the digital image data by applying the matrix to the digital image data to at least perform colorimetry calibration associated with one or more components other than the optical filter. The digital image data can include first, second, and third colors, and the processor can modify values for the first color based at least on the operation settings for the optical filter. The first color can include blue image data. The processor can modify the values of the first color by reducing the values for the first color a greater amount when an opacity level of the optical filter is at a first level than when the opacity level of the optical filter is at a second level different from the first level. The processor can modify the values of the digital image data so as to counteract a color shift caused by the optical filter. The processor can modify the values of the digital image data so as to counteract a white point shift in the digital image data caused by the optical filter. The processor can modify the values of the digital image data so as to counteract a white point shift in the digital image data caused by the optical filter. The processor can modify the values of the digital image data in accordance with a first function to counteract a white point shift in the digital image data caused by the optical filter and in accordance with a second function to counteract a color shift caused by the optical filter, and the processor can modify the values of the digital image data in accordance with the first function before modifying the values of the digital image data in accordance with the second function. The processor can modify the digital image data by reducing the values of the digital image data a greater amount when the operation settings for the optical filter indicate a temporal filtering mode than when the operation settings for the optical filter indicate a global shuttering mode. The optical filter can be a part of a lens mount releasably connected to the camera housing. When the operation settings for the optical filter indicate a temporal filtering mode, the processor can modify the values of the digital image data based at least on a shutter angle associated with the optical filter. The processor can set the operation settings for the optical filter at least in part according to a user input. The optical filter can be included in a lens mount removably attached to the camera housing. The camera can further include the optical filter, which can be contained within the camera housing. The optical filter can include a liquid crystal panel. The processor can generate the control information so as to operate the optical filter in at least three different modes corresponding to: (i) a temporal filtering mode in which the optical filter gradually increases its transmissivity to a first level, and subsequently gradually decreases the transmissivity from the first level before the end of the exposure period; (ii) a global shutter mode wherein the optical filter (a) maintains a first level of transmissivity, (b) abruptly increases transmissivity from the first level to a second level, (c) maintains the second level of transmissivity, and (d) abruptly decreases transmissivity from the second level; and (iii) a neutral density mode wherein the opacity is maintained at a constant value over the exposure period.

In an embodiment, a method of operating a camera includes: identifying operation settings for an optical filter having a variable opacity; adjusting, with a processor, an opacity level of the optical filter over an exposure period in accordance with the operation settings for the optical filter; converting, with an image sensor within a camera housing, light entering the camera housing into digital image data, the light passing through the optical filter prior to arriving at the image sensor; and modifying values of the digital image data based at least on the operation settings for the optical filter.

The method of the preceding paragraph can include one or more of the following features: The operation settings for the optical filter can include a neutral density setting, and the method can further include maintaining an opacity level of the optical filter over the exposure period at a level that corresponds to the neutral density setting. The modifying can include applying a matrix to the digital image data to at least counteract an effect of the optical filter on the digital image data. The modifying can include modifying the digital image data in accordance with a first function to counteract a white point shift in the digital image data caused by the optical filter before modifying the digital image data in accordance with a second function to counteract a color shift caused by the optical filter. The modifying can include reducing the values of the digital image data a greater amount when the operation settings for the optical filter indicate a temporal filtering mode than when the operation settings for the optical filter indicate a global shuttering mode.

In an embodiment, a camera can include a camera housing, an image sensor within the camera housing, and a processor in communication with the image sensor. The image sensor can convert light entering the camera housing into digital motion picture image data. The light can pass through a variable opacity optical filter situated in the optical path prior to arriving at the image sensor. The processor can receive an indication of a user-selected operational mode for the optical filter, and the operational mode can be selected from at least two available operational modes including a temporal filtering mode and a global shutter mode. For each image frame of a plurality of image frames represented by the digital motion picture image data, over an exposure period corresponding to at least a portion of a frame period corresponding to the image frame: (i) if the user-selected operational mode is the temporal filtering mode, generate control information that causes the optical filter to gradually increase its transmissivity to a first level, and to subsequently gradually decrease the transmissivity from the first level before the end of the exposure period; and (ii) if the user-selected operational mode is the global shutter mode, generate control information that causes the optical filter to: (a) maintain a first level of transmissivity; (b) abruptly increase transmissivity from the first level to a second level; (c) maintain the second level of transmissivity; and (d) abruptly decrease transmissivity from the second level. Moreover, the at least two operational modes can further include a neutral density mode, where the processor can, if the user-selected operational mode is the neutral density mode, maintain a substantially constant level of transmissivity over the exposure period.

In an embodiment, a lens mount includes a camera interface disposed on a camera side of the lens mount, a lens interface disposed on a lens side of the lens mount, an opening extending through the lens mount from the lens side to the camera side along an optical path, a variable opacity optical panel, and electronics. The camera interface can releasably attach to a corresponding interface on a camera body. The lens interface can releasably accept a lens. The variable opacity optical panel can be situated in the optical path such that light passing through the opening is incident on the optical panel. The electronics can adjust the opacity of the optical panel in response to control information received via the camera interface.

BRIEF DESCRIPTION OF THE DRAWINGS

The drawings are provided to illustrate example embodiments described herein and are not intended to limit the scope of the disclosure. Throughout the drawings, reference numbers may be re-used to indicate general correspondence between referenced elements.

FIG. 3 shows a camera system including an embodiment of a lens mount having an integrated optical filter.

DETAILED DESCRIPTION

Various aspects of the disclosure will now be described with regard to certain examples and embodiments, which are intended to illustrate but not to limit the disclosure. Nothing in this disclosure is intended to imply that any particular feature or characteristic of the disclosed embodiments is essential. The scope of protection is defined by the claims that follow this description and not by any particular embodiment described herein.

Systems, apparatus and methods are described herein for optical filtering, e.g., using one or more variable-opacity optical filters. The optical filters can be integrated with an existing camera component, such as a lens mount or camera body. The filters can operate in one or more of multiple modes, including modes for neutral density filtering, temporal filtering, or global shuttering.

Camera System Overview

Figure 1A:
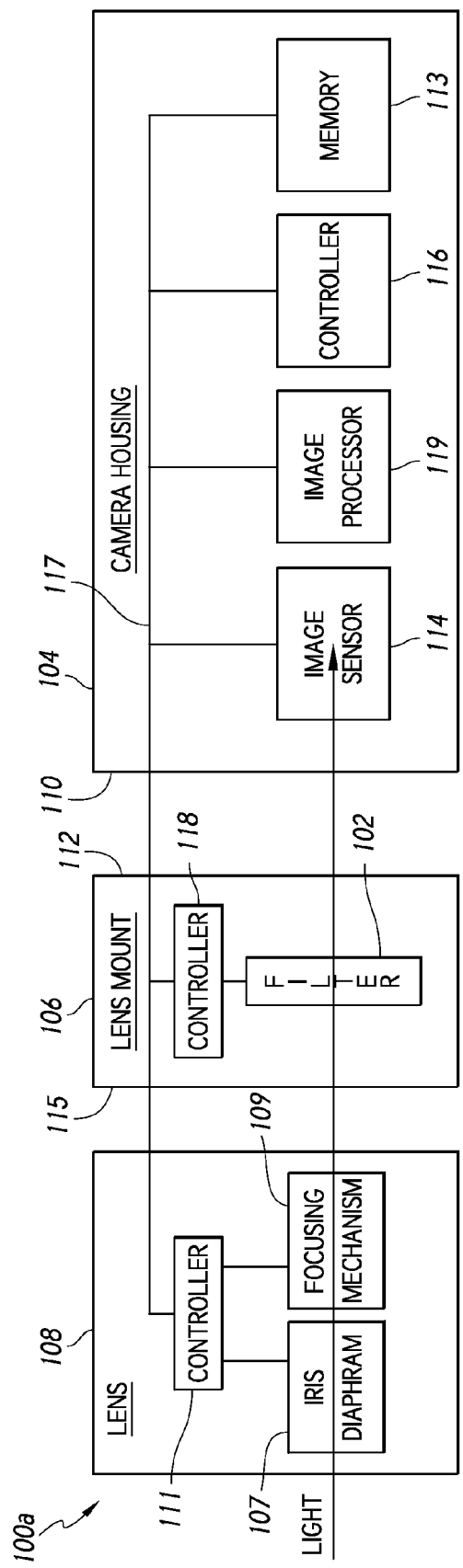
FIG. 1A illustrates a camera system including a lens mount having an optical filter.
Figure 1B:
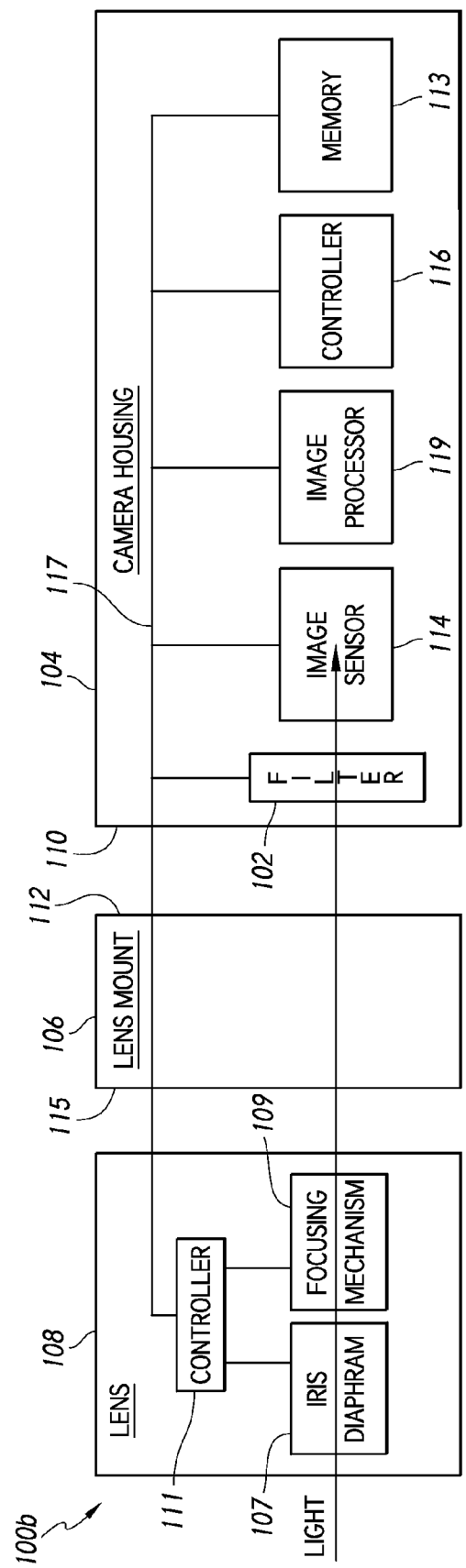
FIG. 1B illustrates a camera system having an optical filter within the camera housing.

FIGS. 1A-C illustrate various configurations of camera systems 100a, 100b including one or more optical filters 102. The camera systems 100a, 100b can be used to detect and process video image data. The camera system 100a of FIG. 1A includes a camera housing 104, a lens mount 106, and a lens 108. The camera housing 104 is provided with a lens mount interface 110 for releasable attachment with a corresponding interface 112 of the lens mount 106. The lens mount 106 further includes a lens interface 114 configured to accept and support the lens 108. The camera system 100a may generally incorporate components or functionality of, or be otherwise similar to or the same as any of the cameras described in U.S. Pat. No. 8,237,830, issued on Aug. 7, 2012, titled "VIDEO CAMERA" or U.S. Pat. No. 8,525,925, issued on Sep. 3, 2013, titled "MODULAR DIGITAL CAMERA," the entireties of each of which are hereby incorporated by reference.

The camera system 100a includes at least one image sensor 114, at least one memory 113, at least one controller 116, at least one image processor 119 within the camera housing 104. The controller 116 generally manages operation of the image sensor 114, and can be in communication with a lens mount controller 118 of the lens mount 106 so as to synchronize operation of the optical filter 102 and image sensor 114. The lens mount controller 118, in certain embodiments, communicates and controls operation of the lens 108, e.g., at the direction of the controller 116. The image processor 119 generally processes the image data output from the image sensor 114. Before or after the image processor 119 processes the image data, the image data can be stored to the memory 113. The image processor 119 can format the data stream from the image sensor 114 in any known manner and can separate green, red, and blue image data into separate data compilations. For example, the image processor 119 can separate the red data into one data element, the blue data into one blue data element, and the green data into one green data element. Although the controller 116 and image processor 119 are shown as a separate processor and controller in the illustrated embodiment of FIG. 1, the controller 116 and image processor 119 can be implemented using the same processor or controller in other embodiments.

In some embodiments, the camera system 100a also includes one or more of a compression module (not shown) for compressing image data, display (not shown) for displaying images to a user of the camera system 100a, and display controller (not shown) for controlling the images shown by the display. The one or more of the compression module, display, and display controller can be in communication with the image sensor 114, the memory 113, the controller 116, and the image processor 119. The compression module can be incorporated within the image processor 119, for example.

The image sensor 114 can be any type of image sensing device, including, for example, but without limitation, CCD, CMOS, vertically-stacked CMOS devices such as the Foveon® sensor, or a multi-sensor array using a prism to divide light between the sensors. The image sensor 114 can provide variable resolution by selectively outputting a predetermined portion of the image sensor 114, and the image sensor 114 and image processor 119 can allow a user to identify the resolution of the image data output. In addition, the sensor 114 can include a Bayer pattern filter. As such, the sensor 114, by way of its chipset (not shown) may output data representing magnitudes of red, green, or blue light detected by individual photocells of the image sensor 114. The chipset of the image sensor 114 can be used to read the charge on each element of the image sensor and thus output a stream of values in, for instance, RGB format output. In some configurations, the camera 100a can be configured to record and/or output video (e.g., compressed raw video) at "2 k" (e.g., 2048×1152 pixels), "4 k" (e.g., 4,096×2,540 pixels), "4.5 k" horizontal resolution, "5 k" horizontal resolution (e.g., 5120× 2700 pixels), "6 k" horizontal resolution (e.g., 6144×3160), or greater resolutions. In some embodiments, the camera can be configured to record compressed raw image data having a horizontal resolution of between at least any of the above-recited resolutions. In further embodiments, the resolution is between at least one of the aforementioned values (or some value between the aforementioned values) and about 6.5 k, 7 k, 8 k, 9 k, or 10 k, or some value therebetween). As used herein, in the terms expressed in the format of xk (such as 2 k and 4 k noted above), the "x" quantity refers to the approximate horizontal resolution. As such, "4 k" resolution corresponds to about 4000 or more horizontal pixels and "2 k" corresponds to about 2000 or more pixels. Using currently commercially available hardware, the sensor can be as small as about 0.5 inches (8 mm), but it can be about 1.0 inches, or larger. Additionally, the image sensor 114 can be configured to provide variable resolution by selectively outputting only a predetermined portion of the sensor 114. For example, the sensor 114 and/or the image processing module can be configured to allow a user to identify the resolution of the image data output. Moreover, the camera 100a can be configured to capture and/or record image data (e.g., compressed raw image data) at any of the above resolution levels at frame rates of These processes can also be applied to the processing of continuous video, e.g., at frame rates of greater than 23 frames per second, as well as frame rates of 20, 23.98, 24, 25, 29.97, 30, 47.96, 48, 50, 59.94, 60, 120, and 250 frames per second, or other frame rates between any of these frame rates or greater.

The lens 108 can be supported by the lens mount 106 and camera housing 104 in a manner that leaves the lens 108 exposed at the outer surface of the camera housing 104. The lens 108 can include one or more optics and focus incoming light onto a light-sensitive surface of the image sensor 114. The lens 108 can provide variable zoom, aperture, and focus functionality. The lens 108 can include an iris diaphragm 107 in the optical path between a point in front of the lens 108 and the image sensor 114. The iris diaphragm 107 can include a diaphragm mechanism configured to define an adjustable-size aperture stop or hole in the optical path. The lens 108 can include a focusing mechanism 109 disposed in the optical path and including at least one lens assembly configured to adjust a focus of light passing through the focusing mechanism 109 to the image sensor 114. In addition, the lens 108 can include a lens controller 111 that controls operations of the iris diaphragm 107 and focusing mechanism 109. The lens controller 111 can control the iris diaphragm 107 and focusing mechanism 109, in some cases, at the direction of the controller 116.

The lens mount controller 118 can also control operation of the optical filter 102, e.g., at the direction of the controller 116. The optical filter 102 can be an electronically-controllable optical element. An opacity of the optical filter 102 can be controlled according to a desired function to provide, for example, temporal filtering (e.g., to reduce temporal aliasing as described in U.S. Patent Application Publication No. 2012/0062845, published on Mar. 15, 2012, titled "APPARATUS AND METHOD FOR IMPROVED MOTION PICTURE CAMERAS", the entirety of which is hereby incorporated by reference), global shuttering, or neutral density filtering. For instance, the optical filter 102 can include a liquid crystal element that can be controlled according to a drive voltage to vary the instantaneous illumination on the image sensor 114 over the course of one or more exposures. In one implementation, the liquid crystal element may be opaque when supplied with a voltage (e.g., a sinusoidal AC voltage signal) and transparent when not supplied with a voltage, and the root mean square (RMS) of the supplied voltage can be increased to increase the opacity of the liquid crystal element and decreased to decrease the opacity of the liquid crystal element. The liquid crystal element can be overdriven (e.g., driven at an AC voltage that may not be maintained in steady-state operation), in some cases, to increase the speed of transition from transparent to opaque. In another implementation, a polarizer can be included in the optical filter 102 in the optical path before or after the liquid crystal element, and by varying the supply of power to the liquid crystal element, the polarity of the liquid crystal element can be varied so as to control the illumination from opaque to transparent. In other instances, the optical filter 102 can additionally or alternatively include one or more rotatable polarizers, an exposure control wafer including perforations, or one or more other optical filters usable to vary the instantaneous illumination on the image sensor 114 over the course of one or more exposures. The lens mount controller 118 and/or the optical filter 102 can include drive electronics for changing the opacity of or otherwise driving the optical filter 102. As a result, the lens mount 106 can at least in part take over shuttering duties for the camera system 100a. For instance, the lens mount 106 can be considered to take over shuttering duties for the camera system 100a when the camera system 100a may be operating in the temporal filtering or global shuttering modes.

To provide temporal filtering, the optical filter 102 can generally be controlled to provide prefiltering functionality. For example, the optical filter 102 can provide intensity or illumination filtering over time to generate an exposure window function that exhibits some transitional values other than 0 (fully opaque) and 1 (fully transparent), in certain modes of operation. In one example, the optical filter 102 functions as a prefilter to reduce temporal aliasing to provide an illumination that continuously varies and exhibits transitional values other than 0 (fully opaque) and 1 (fully transparent) during a single exposure.

Figure 2:
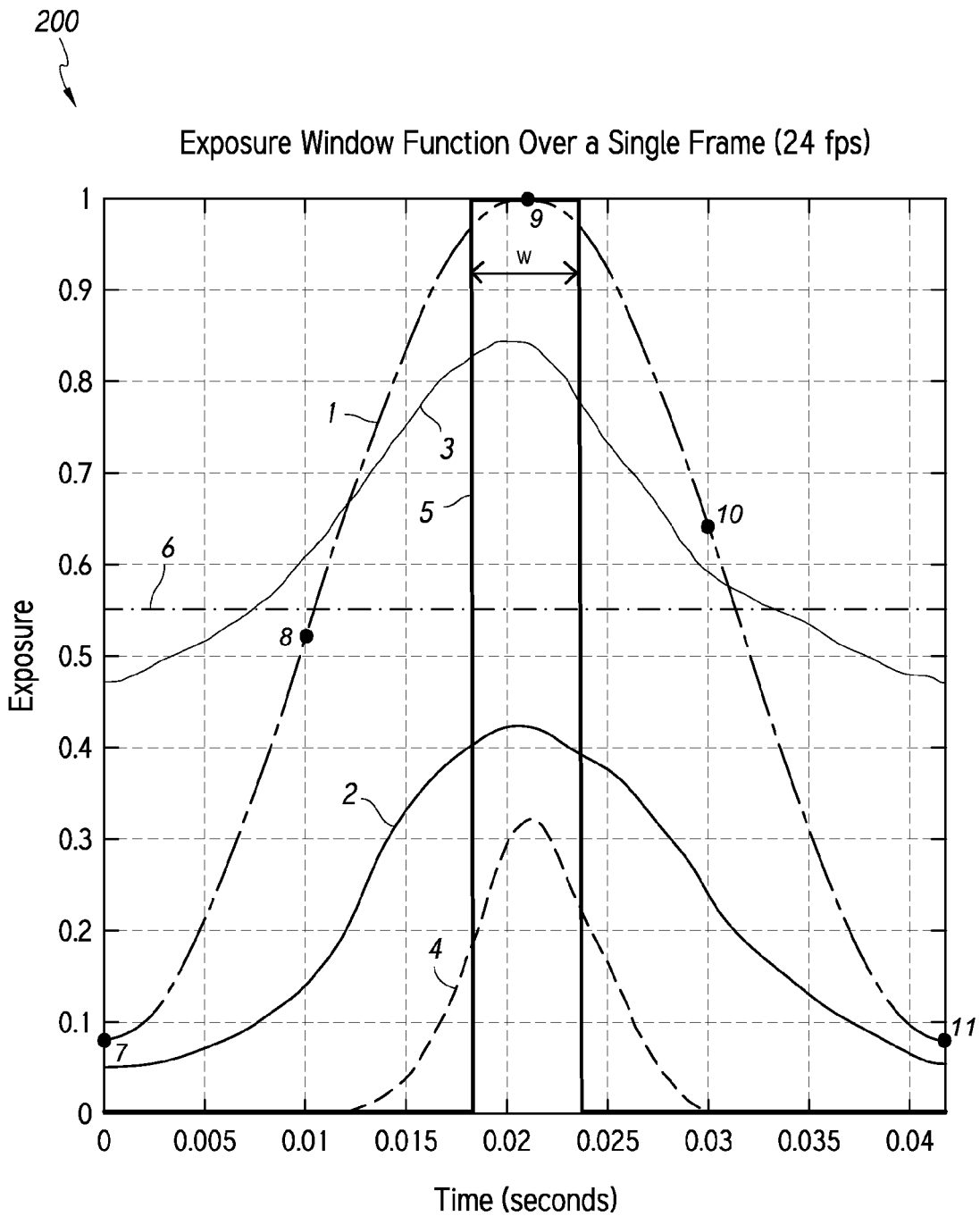
FIG. 2 is a plot of exposure window functions over a single frame.

The plot 200 of FIG. 2 illustrates multiple example exposure window functions 1-6 producible by the optical filter 102 for achieving temporal filtering, e.g., to reduce temporal aliasing and other types of motion artifacts. The exposure window functions 1-6 show an exposure (e.g., opacity or transmissivity) of the optical filter 102 over time, where 1 may correspond to fully opaque and 0 may correspond to fully transparent. Compatible temporal filtering functions may, for example, gradually transition during a frame period from a "closed" state (e.g., at a fully opaque state or otherwise at a lowest level of transmissivity for the exposure period), to an "open" state (e.g., at a fully transparent or otherwise at a highest level of transmissivity for the exposure period), and then back to the closed state. The exposure window functions 1-4 illustrate example generally Gaussian-shaped exposure window functions for achieving temporal filtering, while the exposure window functions 5 and 6 respectively illustrate global shuttering and neutral density exposure window functions. Although the exposure window functions 1-6 are shown for a shutter speed or frame rate of 24 frames per second (fps), other shutter speeds or frame rates can be used in other cases, and exposure window functions having other shapes can be used in other cases. Moreover, in some modes of operation, a camera system like the camera system 100a can enable different shutter angles to be selected and implemented. In such cases, the exposure window functions 1-6 can be applied to expose an image sensor to light for a duration corresponding to the shutter angle for the camera system.

As can be seen from the exposure window function 1 of plot 200, for instance, the exposure of the optical filter 102 can vary over time and, in some cases, over a single frame. The exposure of the exposure window function 1 can begin at point 7 with an exposure level of about 0.08 at time 0.000 seconds, steadily increase to point 8 with an exposure level of about 0.52 at time 0.010 seconds, peak at point 9 with an exposure level of about 1.00 at time about 0.022 seconds, steadily decrease to point 10 with an exposure level of about 0.64 at time 0.030 seconds, and end at point 11 with the exposure level of about 0.08 at time about 0.043 seconds. Thus, the exposure window function 1 can be characterized over the course of a single frame by one or more of: (i) the initial exposure level, (ii) the rate of exposure level increase from the initial exposure level to the peak exposure level, (iii) the peak exposure level, (iv) the rate of exposure level decrease from the peak exposure level to the end exposure level, and (v) the end exposure level. In one example implementation, such as illustrated by the exposure window function 1, the opacity of the optical filter 102 can vary gradually from an original opacity level to another opacity level and back to the original opacity level during a single frame, and the opacity level can transition through multiple intermediate opacity levels when adjusting between the original opacity level and the another opacity level.

As can be seen from the exposure window function 5 of plot 200, as another example, the exposure of the optical filter 102 can vary over time and, in some cases, over a single frame in a way that may be relatively abrupt and less gradual than the transitions of the exposure window function 1. In particular, exposure of the exposure window function 5 can begin at an exposure level of about 0.00 at time 0.000 seconds, remain at the exposure level of about 0.00 until an initial time of about 0.018 seconds, abruptly increase to an exposure level of about 1.00 after the initial time of about 0.018 seconds, remain at the exposure level of about 1.00 until a subsequent time of about 0.023 seconds, abruptly decrease to the exposure level of about 0.00 after the subsequent time of about 0.023 seconds, and remain at the exposure level of about 0.00 until time 0.043. The exposure window function 5, accordingly, can be characterized over the course of a single frame by one or more of: (i) the initial time when exposure level abruptly changes, (ii) the subsequent time when the exposure level again abruptly changes, (iii) a width period w between the initial time and subsequent time, and (iv) the exposure levels before and after the transitions. The illustrated waveform corresponding to exposure window function 5 corresponds to a global shutter mode having an associated shutter angle of about 42 degrees [(0.005 s/0.043 s)*360 degrees)]. In one example implementation, such as illustrated by the exposure window function 5, the opacity of the optical filter 102 can vary abruptly from an original opacity level to another opacity level and back to the original opacity level once during a single frame.

The optical filter 102 can be controlled to provide a global shuttering function. For instance, the opacity of the optical filter 102 can be controlled so that all of the image sensing elements of the image sensor 114 can be exposed to light at the same time or substantially the same time, for example, such as by generating the exposure window function 5 of plot 200. As shown, the optical filter 102 can be controlled to generate a relatively sharp transition from a "closed" state, where the filter 102 is at a maximum opacity level (or is at some other baseline level of opacity), to an "open" state, where the filter 102 is at its maximum level of transmissivity (or is at some other top-end level of opacity). The filter 102 is held at the open state for a pre-defined duration before sharply transitioning back to the closed state. In this manner, the image sensing elements of the image sensor 114 may be exposed to light for a relatively limited duration. The global shuttering function can eliminate, for instance, rolling shutter artifacts like partial illumination caused by strobe lights. In some cases, this type of global shuttering function is referred to as implementing a "hard" global shutter, or a "square shutter" because of the sharp transition from closed to open and open to closed. Conversely, the temporal filtering function described above can be referred to as a "soft" global shutter" or a "soft shutter", because there is a similar transition from closed to open, and back to closed, but it is a gradual transition.

The optical filter 102 can also be controlled to provide a neutral density filtering function. For instance, where the optical filter 102 is a liquid crystal, the lens mount controller 118 can provide a substantially constant amplitude signal to the liquid crystal so that the liquid crystal provides a desired constant opacity level throughout the entirety or the substantial entirety of the frame period. The amplitude of the signal can be controlled (e.g., based on a user-selected stop value) to achieve a desired opacity level and corresponding neutral density filtering effect. This is in contrast to the temporal filtering mode and the global shuttering modes, where the opacity level of the optical filter 102 changes during one or more frame periods according to a filtering function.

In certain embodiments, the optical filter 102 can be operated in at least three modes, e.g., the temporal filtering mode, the global shuttering mode, or the neutral density filtering mode. In some embodiments, optical filter 102 can be operated in at least one or two of the three modes. A user interface (not shown) can be provided to allow a user to configure operation and modes of the optical filter 102. For instance, a graphical user interface provided on the display (not shown) of the camera system 100a. Alternatively, one or more knobs, buttons or other controls may be provided. Having multiple modes of operation can be particularly useful in adapting to various shooting conditions and in providing users with creative flexibility. For many scenes, a typical rolling shutter can provide a "film-like" look to the recorded video, and may be appropriate in many situations. In such cases, the user can inactivate the optical filter 102 (or operate in neutral density mode) to capture data using the native rolling shutter of the image sensor 114.

The square shutter, global shuttering mode (abrupt closed/open/closed) can be used where rolling shutter-induced motion artifacts are of particular concern, in order to provide a relatively accurate representation of motion. For instance, the global shutter mode can reduce striping or tearing artifacts from uncontrolled strobes or flashes, reduce the so called "jello" effect, so that fast-moving subjects are not angled or sheared, and can reduce blurring or wobbling due to rapid camera movements.

On the other hand, where there is a desire to reduce temporal aliasing or other motion artifacts, while preserving a film-like look, the user can elect to put the filter 102 in the soft-shutter, temporal filtering mode. The temporal filtering mode can generally provide the following benefits, among others:

Allow for proper capture of the direction of rotation of cyclical motion, such as a rotation propeller.
Soften blur while preserving clarity.
Reduce judder while panning.
Render human movement relatively accurately and naturally.
Reduce flickering without requiring continuous or synchronized lighting.
Reduce striping or tearing artifacts from uncontrolled strobes and flashes.
Reduce the "jello" effect.
Reduce blurring and wobbling due to camera movement.

The user interface may provide a variety of different programming options for the optical filter 102. For example, a mode selection option may be provided to select between a neutral density filtering mode, a temporal filtering mode, and a global shuttering mode. In some embodiments, a combined temporal filtering and neutral density mode and a combined global shuttering and neutral density mode are also provided. Each mode may have corresponding user selectable options. For example, the optical filter can change the effective sensitivity to light ("effective ISO") of the camera, such as in the neutral density filtering mode where the effective ISO is reduced because the optical filter 102 reduces light transmission to the image sensor 114. To provide the user with a gauge as to the degree of this effect, the user interface can optionally display an effective ISO for image data so as to enable a user to better understand the impact of the opacity of the optical filter 102 on the image data in view of one or more other camera settings. This user interface can provide both the effective ISO and the native ISO of the image sensor 114.

Moreover, the user interface can also allow the user to select a particular desired effective ISO, using a graphical slider or other type of control. In some embodiments, adjusting the effective ISO actually adjusts the cameras native ISO, not the opacity of the optical filter 102, which may instead be controlled by adjusting the neutral density stop value, for example. The user interface can additionally allow the user to select a value for the native ISO directly, in addition to the indirect adjustment achieved via selection of the desired effective ISO.

For the neutral density filtering mode, a user may be able to select an effective stop value. In one embodiment, the user can interact with the user interface to program the optical filter 102 to behave as a neutral density filter, and can select a stop value from 1.5 to 9.0 in $\frac{1}{10}$ stop increments. In some embodiments, the neutral density filter has stop values from 0.01 to 9.0 in $\frac{1}{100}$, $\frac{1}{10}$, or 1 stop increments (e.g., 0.01, 1.0, 1.43, 2.0, 3.0, 4.0, 5.0, 6.0, 7.0, 8.0, 9.0). In particular embodiments, neutral density filtering can be always active when the lens mount 106 is connected to the camera housing 104 such the camera system 100*a* can operate in one of three select modes: (1) the neutral density filtering mode, (2) the combined temporal filtering and neutral density mode, and (3) the combined global shuttering and neutral density mode.

In some embodiments, the range of stop values for the camera system 100*a* can depend on the mode of operation. For example, when operating in the neutral density mode and not the temporal filtering or global shuttering modes, the allowable range of stop values for the optical filter 102 can be from 1.6 to 8.0 stops. On the other hand, when operating in the temporal filtering or global shuttering modes, the allowable range of stop values for the optical filter 102 can be from 1.6 to 4.0 stops.

For the temporal filtering and global shuttering modes, the interface may allow the user to select a shutter angle for the optical filter 102. When operating in the temporal filtering mode, the optical filter 102 may also behave as a neutral density filter. In some embodiments, the user can select one of a group of temporal filtering functions, each of which provide a different result (e.g., a different amount or quality of aliasing reduction).

As discussed, a combined temporal filtering and neutral density mode and a combined global shuttering and neutral density mode may also be provided. In such cases, a user may also be able to select a stop value for the neutral density function, similar to the stand-alone neutral density mode. In the combined temporal filtering and neutral density mode, in one example, the general shape of the function applied to the optical filter 102 may be similar to the exposure window function 1 shown in the plot 200 of FIG. 2. For instance, the shape of the exposure window function may be Gaussian or otherwise substantially symmetric about a peak that is reached substantially mid-way through the frame period (or mid-way through a portion of the frame period corresponding to a selected shutter angle for the temporal filtering function). However, depending on the stop value, the average transparency (or opacity) of the optical filter 102 over the duration of the frame may change. For instance, referring to the plot 200 of FIG. 2, the exposure window function 1 or a portion thereof may be generally squashed or shifted down with increasing stop values, or be otherwise adjusted to further reduce the amount of light passing through the optical filter during the frame period. For example, the exposure window function 1 can be generally reduced to become the exposure window function 2 of the plot 200. Conversely, for instance, the exposure window function 2 or a portion thereof may generally shift upwards with decreasing stop values, or be otherwise adjusted to increase the average amount of light passing through the optical filter during the frame period. For example, the exposure window function 2 can be generally increased to become the exposure window function 1 of the plot 200.

In some cases, the optical filter 102 can pass light through the optical filter 102 in a manner that results in an increase in the amount of infrared or other contamination incident on the image sensor 114. Such cases can include when operating the optical filter 102 in a neutral density filtering mode, when not operating the optical filter 102 in the neutral density filtering mode but with a high neutral density, or when operating the optical filter 102 in a temporal filtering mode or global shuttering mode. As an example, the optical filter 102 may act in operation as an infrared pass filter that allows a significant increase in the amount of infrared light to reach the image sensor 114. To counteract such effects, the camera system 100*a* may include one or more filters (not shown) placed in the optical path. The one or more filters can be an optical low pass filter (OLPF), anti-aliasing filter, IR cut-off filter, or heat-absorbing filter, for example, and can be considered one or more additional filters because the camera housing 104 may also additionally include a different OLPF, and the additional filter is used to block additional infrared or other contamination resulting from the use of the optical filter 102. In one embodiment, the additional filter can include an optical coating or film adhered to or otherwise deposited on one or more surfaces of the optical filter 102. For instance, where the optical filter 102 is a liquid crystal display panel, an optical coating or film configured to pass visible light but block infrared light may be applied to a glass cover or other surface of the liquid crystal display panel (or be otherwise to appropriately applied to the liquid crystal display panel). In other cases, an antireflection or other type of coating can be applied instead of or in addition to the additional filter. In yet other cases, the additional filter may comprise a physically separate panel or other optical component, not adhered to or otherwise forming a part of the optical filter 102. In such cases, the additional filter may be positioned at any appropriate point in the optical path.

Where filtering is not desired, the optical filter 102 can also be selectively deactivated. For instance, where a liquid crystal is used, the liquid crystal can be controlled to exhibit a maximum level of transparency. However, in some cases, the liquid crystal or optical filter 102 has some minimal level of opacity or other optical effect that may be undesirable where filtering is not wanted. To address this, the optical filter 102 can be removed from the optical path in some cases. One such case is discussed further with respect to FIGS. 5A-F.

As shown in FIG. 1A, the optical filter 102 can be incorporated into the lens mount 106. Thus, users can enjoy the benefits of the optical filter 102 via standard installation of the lens mount 106, and without having to attach a separate, dedicated filtering component. Moreover, signals for controlling the optical filter 102 can be routed along a communication pathway 117 directly from the camera housing 104 via the interface 112, e.g., without the use of an external cabling or external camera ports. This configuration provides seamless integration of the optical filter 102 into the system. In addition, decoupling the optical filter 102 functionality from the camera housing 104 provides system modularity. For instance, existing customers can benefit from the use of the optical filter 102 by purchasing a relatively inexpensive lens mount 106 having the optical filter 102, without having to purchase a significantly more expensive camera housing 104 that includes the optical filter 102. Similarly, as upgrades to the optical filter 102 become available, users can benefit from the upgrades by purchasing a new lens mount 106 instead of a new camera housing 104. Other customers can opt to purchase a lower cost system by purchasing a standard lens mount that does not include the optical filter 102. The lens mount 106 incorporating the optical filter 102 and/or other implementations of optical filters 102 described herein can be incorporated into modular cameras such as the ones described in U.S. Pat. No. 8,525,924, issued on Sep. 3, 2013, and titled "MODULAR MOTION CAMERA", the entirety of which is hereby incorporated by reference herein.

In other cases, the optical filter 102 is incorporated into the camera housing 104. For instance, FIG. 1B illustrates a camera system 100*b* similar to the camera system 100*a* of FIG. 1A where the optical filter 102 is provided within or is otherwise supported by the camera housing 104. As a result, the lens mount 106 may also not include the lens mount controller 118. This implementation can provide certain benefits. For example, because optical filter 102 may be more tightly coupled to the controller 116 and other electronics within the camera housing 104, communication with the optical filter 102 for synchronization and other control purposes may be more reliable, and design complexity may be reduced.

In some embodiments, multiple optical filters 102 can be employed. For instance, in one embodiment, at least a second optical filter 102 is positioned after the first optical filter 102 in the optical path. Each of the multiple optical filters 102 may of the same type (e.g., liquid crystal panels), or different types can be used. Moreover, the multiple optical filters 102 can provide different functions. For instance, in one embodiment, one of the multiple optical filters 102 can be used to provide neutral density filtering, and the another of the multiple optical filters 102 is used to provide temporal filtering.

Figure 9:
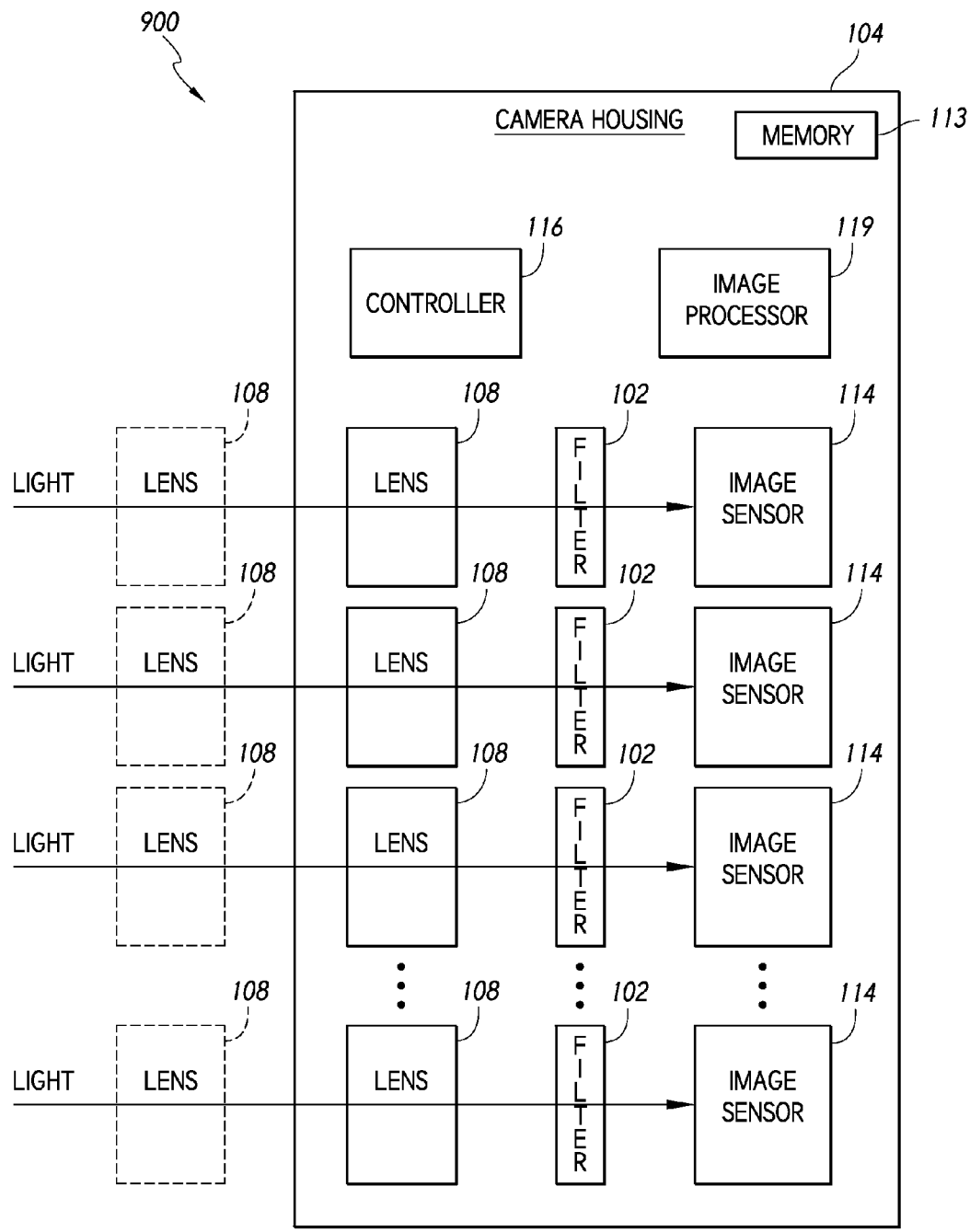
FIG. 9 illustrates an embodiment of a camera system having a plurality of imagers and corresponding optical filters.

FIG. 9 illustrates a camera system 900 similar to the camera system 100*a* of FIG. 1 that incorporates multiple optical filters 102. The camera system 900 includes multiple image sensors 114 and corresponding lenses 108. One or more of the multiple optical filters 102 can be included in the optical path between a corresponding lens 108 and image sensor 114. In some cases, one or more of the optical filters 102 may instead be positioned before the corresponding lens 108 in the optical path. The combination of the image sensor 114 and a corresponding lens 108 may be referred to as an imager.

Exposure Control Using Optical Filters

For conventional cameras, scene lighting changes are sometimes accounted for by manual or automatic adjustment of aperture, shutter speed, or both to maintain desired exposure. Such changes however, can alter the quality or character of a shot in an undesirable manner, by altering depth of field, desired motion effect, or the like. It can therefore be desirable to maintain constant or substantially constant certain camera settings, such as aperture, shutter speed, depth of field, sensitivity (ISO), color temperature, and the like, while maintaining an exposure at a desired level or within a desired range. This can be particularly true in shooting environments where lighting conditions often change dramatically, such as for outdoor exposures where clouds may move over the sun.

In some embodiments, the optical filter 102 can be controlled so as to control exposure, such as an exposure level associated with digital image data captured by an image sensor 114. For example, the opacity of the optical filter 102 can be controlled so as to adjust the amount of light incident on the image sensor 114, thereby maintaining a constant or substantially constant exposure level (or maintaining an exposure level within a desired range). As shown, the optical filter 102 or other optical element can be positioned along an optical path between a point outside of the camera body and the image sensor 114.

A user can, according to some aspects, select an exposure value (or exposure range), and the controller 116 can control the optical filter 102 to maintain or substantially maintain the selected exposure value (or range). For instance, in some cases, the opacity of the optical filter 102 is adjusted to control the amount of light incident on the image sensor 114 instead of adjusting one or more of an aperture of the lens 108, a shutter speed (e.g., a digital shutter speed of the image sensor 114 and/or a mechanical shutter speed of the lens 108), and a light sensitivity of the image sensor 114 (e.g., ISO sensitivity). Thus, using the optical filter 102 to maintain exposure can provide the benefit of achieving desired exposure under changing lighting conditions, while also maintaining certain camera settings at desired levels (e.g., a desired aperture, shutter speed, light sensitivity, or color temperature).

In some cases, the image sensor 114 implements an electronic shutter, e.g., via controlled sensor pixel activation and de-activation. Moreover, the camera system 100*a*, 100*b*, or 900 can include a mechanical shutter instead of, or in addition to an electronic shutter, positioned between a point outside the camera system 100*a*, 100*b*, or 900 and the image sensor 114 in the optical path.

The camera system 100*a*, 100*b*, or 900 can include an exposure controller configured to adjust the exposure level at least partly by changing at least one optical characteristic (e.g., opacity) of the optical filter 102. For instance, referring to FIG. 1A, the exposure controller can be implemented by one or more of the controller 116 within the camera housing 104 and the lens mount controller 118 within the lens mount 106.

The exposure controller can be configured to adjust the at least one optical characteristic in response to changes in lighting conditions external to the camera system 100*a*, 100*b*, or 900. For example, the exposure controller can adjust the optical characteristic in response to changes in lighting conditions in the current field of view of the camera system 100*a*, 100*b*, or 900. The adjustment can be in response to processing of the image data captured by the image sensor 114, for example. In such cases, scene lighting changes can be determined based an analysis of the image data, and the exposure controller adjusts the optical characteristic accordingly.

In some cases, the exposure controller controls the optical filter 102 based on an amount of light detected by the image sensor 114, e.g., based on an average light value or some other appropriate algorithm. A variety of different exposure metering techniques can be employed, including center-weighted average metering, spot metering (e.g., where exposure control is based on an analysis of image data corresponding to an area of between about 1%-5% or about 1%-10% of the image), partial area metering, (e.g., where exposure control is based on an analysis of image data corresponding to a partial image area of between about 10-15% of the image), multi-zone metering, and matrix metering, to name a few.

In one implementation, the exposure controller controls the optical filter 102 based on an analysis of a pixel brightness histogram or exposure histogram. As an example, the exposure controller may track the location(s) of one or more peaks in the histogram (exposure values for which there are relatively high numbers of image sensor pixels having those exposure values). In one embodiment, if the peak(s) move toward an end of the histogram corresponding to darker exposure values, this is an indication that objects in the image scene are becoming under exposed, and the exposure controller adjusts the optical filter 102 (e.g., decreases opacity) to increase exposure. If, on the other hand, the peak(s) move toward an end of the histogram corresponding to brighter exposure values, this can be an indication that objects in the image scene are becoming over exposed, and the exposure controller adjusts the optical element (e.g., increases opacity) to decrease exposure.

In some implementations, the exposure controller is configured adjust the at least one optical characteristic in response to changes in lighting conditions detected by a second sensor that is separate than the image sensor 114. For instance, a second image sensor or other type of sensor may be used, which in some cases can be dedicated for use in detecting lighting conditions.

As indicated, it can be useful to control exposure using the optical filter 102 while holding one or more settings constant, substantially constant, or within a particular range of values while adjusting the exposure. For example, the exposure controller may modulate the optical filter 102 to control exposure while the camera system 100*a*, 100*b*, or 900 maintains one or more other camera settings constant, substantially constant, or within a particular range. These other settings can include, without limitation: the size of the lens aperture or other aperture-stop, an adjustable shutter speed of the camera, adjustable sensitivity (e.g., ISO sensitivity value), a white balance setting, and depth of field. For instance, depending on the embodiment, all of these settings or any subset of them may be held constant, substantially constant, or within a particular range while controlling exposure using the optical element. Depending on the setting, the exposure controller can adjust the at least one optical characteristic in order to maintain an exposure level at a desired level or within a desired range while maintaining some or all of the settings within a desired range of plus or minus no more than about 0.5%, 1%, 1.5%, 2%, 3%, 4%, 5%, 10%, 20% or more of an initial or baseline value, for example.

Moreover, while maintaining one or more of the above settings at a desired level in this manner, the exposure controller can additionally adjust the at least one optical characteristic (e.g., opacity of the optical filter 102) in order to maintain an overall exposure level at a constant level, a substantially constant level, or within a particular range. For instance, the exposure controller can adjust the at least one optical characteristic in order to maintain an exposure level within a range of plus or minus no more than about 0.5%, 1%, 2%, 3%, 4%, 5%, 10%, 20%, 30%, 40%, 50%, or more of an initial or baseline (e.g., user selected) exposure level, for example. In some cases, the exposure controller maintains the exposure level within plus or minus a particular (e.g., user selected) number of stops (e.g., 1, 2, 3, 4, or more stops) of an initial or baseline (e.g., user selected) stop value.

Figure 6:
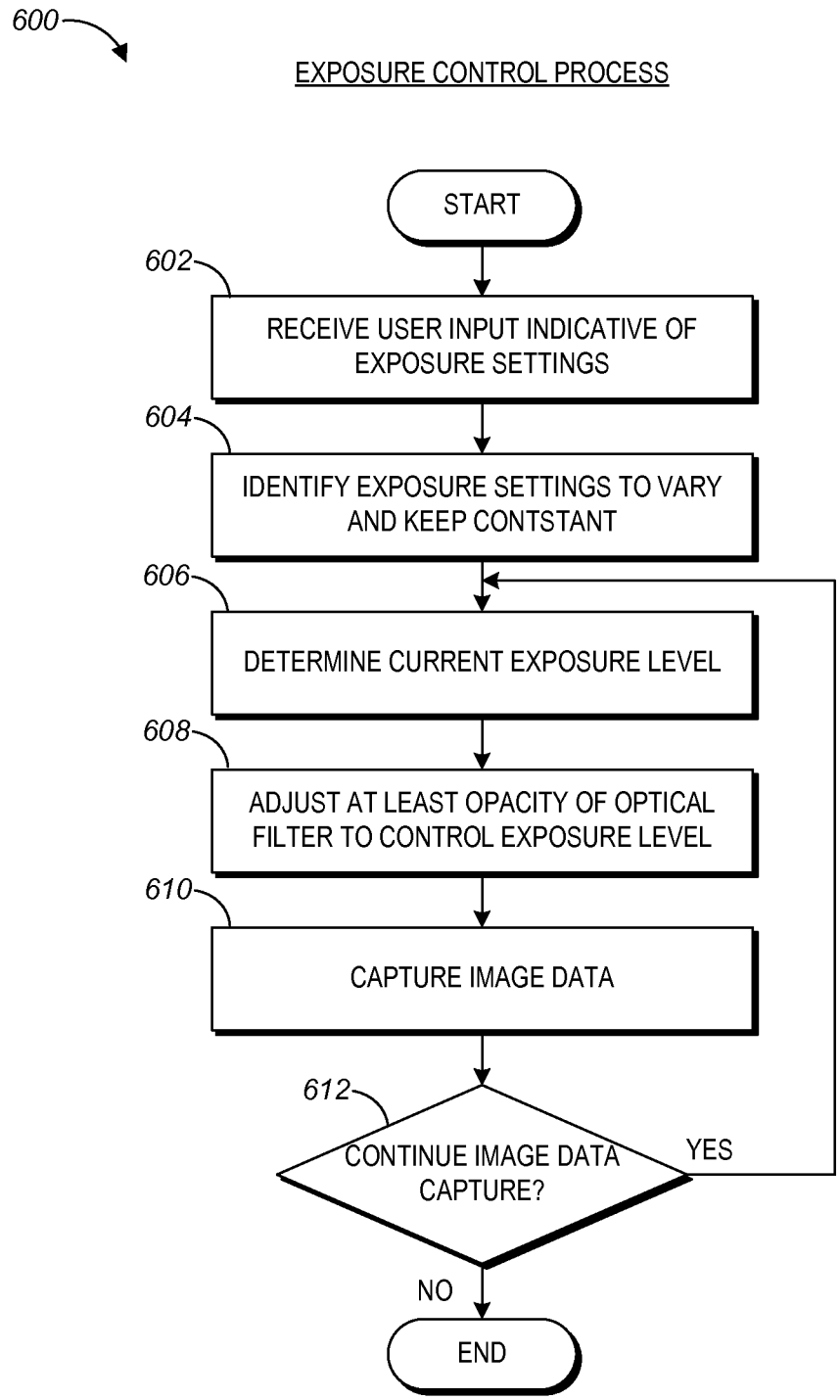
FIG. 6 illustrates an exposure control process performable by a camera system.

FIG. 6 illustrates an exposure control process 600 performable by a camera system, such as the camera system 100*a* or 100*b*. For convenience, the process 600 is described in the context of the camera system 100*a* but may instead be implemented by other systems described herein or other camera systems not shown. The process 600 provides one example approach by which the camera system 100*a* can control exposure using the optical element filter 102 while holding one or more other settings constant, substantially constant, or within a particular range of values.

At block 602, the controller 116 can receive a user input indicative of exposure settings for the camera system 100*a*. The user input, for instance, can indicate one or more of a desired exposure level, size of the lens aperture, an adjustable shutter speed, adjustable sensitivity (e.g., ISO sensitivity value), a white balance setting, and depth of field. The controller 116 can receive the user input from a user interface (not shown) incorporated in the camera housing 104.

At block 604, the controller 116 can identify exposure settings for the camera system 100*a* to vary or keep constant based at least on the user input. For example, the controller 116 can determine to maintain a desired size of the lens aperture and shutter speed at a values or within ranges indicated by the user input, and the controller 116 can determine that the adjustable sensitivity, the white balance setting, and the depth of field may be varied.

At block 606, the controller 116 can determine a current exposure level for light entering the camera housing 104. For instance, the controller 116 can use an intensity of light detected by the image sensor 114 or another image sensor (e.g., a dedicated exposure level sensor) to determine the current exposure level.

At block 608, the opacity of the optical filter 102 can at least be adjusted by the controller 116 to control the exposure level. For example, the opacity of the optical filter 102 can be adjusted so as to bring the current exposure level closer to a desired exposure level indicated by the user input. The controller 116 can also adjust one or more of the exposure settings indicated to be variable based at least on the user input to control the exposure level. Moreover, at the same time, the controller 116 can maintain a level of the one or more exposure settings indicated to be kept constant based at least on the user input.

At block 610, the image sensor 114 can capture image data at the adjusted current exposure level. At block 612, the controller 116 can determine whether to continue image data capture using the image sensor 114. If the controller 116 determines to continue image data capture, the process 600 moves to block 606, and the controller 116 can determine the current exposure level for light entering the camera housing 104. On the other hand, if the controller 116 determines not to continue image data capture, the process 600 ends.

Image Data Processing Approaches

When using the optical filter 102, the image processor 119 process the image data generated by the image sensor 114 to account for certain optical effects caused by the optical filter 102. For instance, light passing through the optical filter 102 in some cases is color shifted. The optical filter 102 can include a liquid crystal panel that can pass more blue light than other colors of light as the opacity of the optical filter 102 increases. This effect may occur when the optical filter 102 is operating in the neutral density mode, for example, and relative amount of blue shift may generally increase with an increasing neutral density filtering stop value. Thus, the sensor can generate image data during capture that is biased towards blue such that blue values of the image data can be relatively higher than values for other colors of the image data. Depending on the type of the optical filter 102 used, other types of color shifting may occur (e.g., a shift in red, green, a shift in two colors, etc.). As another example, the white point of light passing through the optical filter 102 may shift, e.g., when the optical filter 102 is operating in a temporal filtering mode.

The image processor 119 can modify the image data from the image sensor 114 in order to counteract or otherwise reduce the impact of such optical effects caused by the optical filter 102. The degree and type of modification can depend on a configuration (e.g., one or more settings) of the optical filter 102. For instance, in order to address the color shifting effect, the image processor 119 may reduce image data values for an appropriate color(s) (e.g., for blue image data) according to a pre-determined function. The function can be selected based on a selected neutral density stop value. For instance, since higher stop values can result in more color shift, a higher degree of reduction may be applied (e.g., to the blue color data) for increasing stop values in one implementations.

In some cases, the image processor 119 can adjust for a color shift or other effect resulting from use of the optical filter 102, such as a shift towards blue resulting from use of the optical filter 102 in a neutral density filtering mode, by applying an appropriate matrix operation to the image data from the image sensor 114. For instance, a colorimetry calibration involving application of a matrix may be applied to the image data. The colorimetry calibration can involve application of a white balance operation on the image data along with an RGB or other type of gain. The colorimetry calibration, according to certain aspects, takes the image data from native values to XYZ, and can provide a calibration so that the white balance correlated color temperature in kelvin and tint (for colors above or below the Plankian locus) can be accurate. Moreover, the colorimetry calibration can be different for different neutral density stop values, such as for each integer stop value. The calibration process can involve concatenating a matrix tailored to account for the effects of the optical filtering with the standard calibration of the camera system 100a, or can otherwise involve applying such a matrix together with the standard camera calibration. In this manner, the colorimetry calibration that compensates for the optical filtering (e.g., neutral density filtering) and the standard camera color calibration can be applied together as a system. This is in contrast to applying a matrix to account for the neutral density or other optical filtering separately from the applying standard camera colorimetry calibration. In some other cases, a matrix tailored to account for the neutral density or other optical filtering is applied separately from the standard camera colorimetry calibration.

The amount of data utilized to perform the colorimetry calibration can be advantageously reduced in certain implementations. In one example, in-between values can be interpolated. Alternatively or additionally, in another example, offsets into a neutral density table of calibrations can be used for the colorimetry calibration to account for the impact of individual shutter modes including temporal filtering and global shuttering modes. For the temporal filtering mode, an offset increase of 0.67 stops relative to a neutral density associated with the temporal filtering mode can be used for the colorimetry calibration; while for the global shuttering mode, an offset increase of 0.00 stops relative to a neutral density associated with the global shuttering mode can be used for the colorimetry calibration. In other examples, different offset increases can be used.

The above-described approaches involving application of the matrix, e.g., to account for color shifting or other effects due to neutral density filtering can provide beneficial results. For example, such a technique can result in images having more accurate color over a range of neutral density stop values. In alternative embodiments, a gain may be applied to the image data instead of or in addition to applying a matrix. For instance, an RGB gain or balance may be applied by the image processor 119 to the image data when the optical filter 102 is in use.

To address the white point shift described above, the image processor 119 can vary the modification function applied to the image data depending on a shutter angle associated with the temporal filter function or a shutter angle (or effective shutter angle) associated with the image sensor 114. The modification function can generally act to return the image data for one or more of the colors (e.g., for red, green and blue image data) back to a desired white point.

In some cases, the image processor 119 can be configured to counteract multiple different types of optical effects caused by the optical filter 102. For instance, the optical filter 102 in some cases can cause both a color shift (e.g., a blue shift) and a white point shift, such as where the optical filter 102 provides both an effective neutral density function and a temporal filtering function. The image processor 119 can be configured in such cases to modify image data values to counteract both the color shift and the white point shift. In some embodiments, the image processor 119 can beneficially apply a function for counteracting the white point shift before applying a function for counteracting the color shift.

The image processor 119 can generally modify the image data values as part of the image processing pipeline, before the image data is written out to a file, e.g., before it is written out into a file on the memory 113 within the camera housing 104, or to some other storage device. In some alternative embodiments, the processing occurs additionally or alternatively in post-processing. In certain embodiments, the camera system 100a may incorporate image processing functionality such as compressed raw on-board image data handling disclosed in U.S. Pat. No. 8,237,830, issued on Aug. 7, 2012, titled "VIDEO CAMERA," the entirety of which is hereby incorporated by reference herein.

Figure 7:
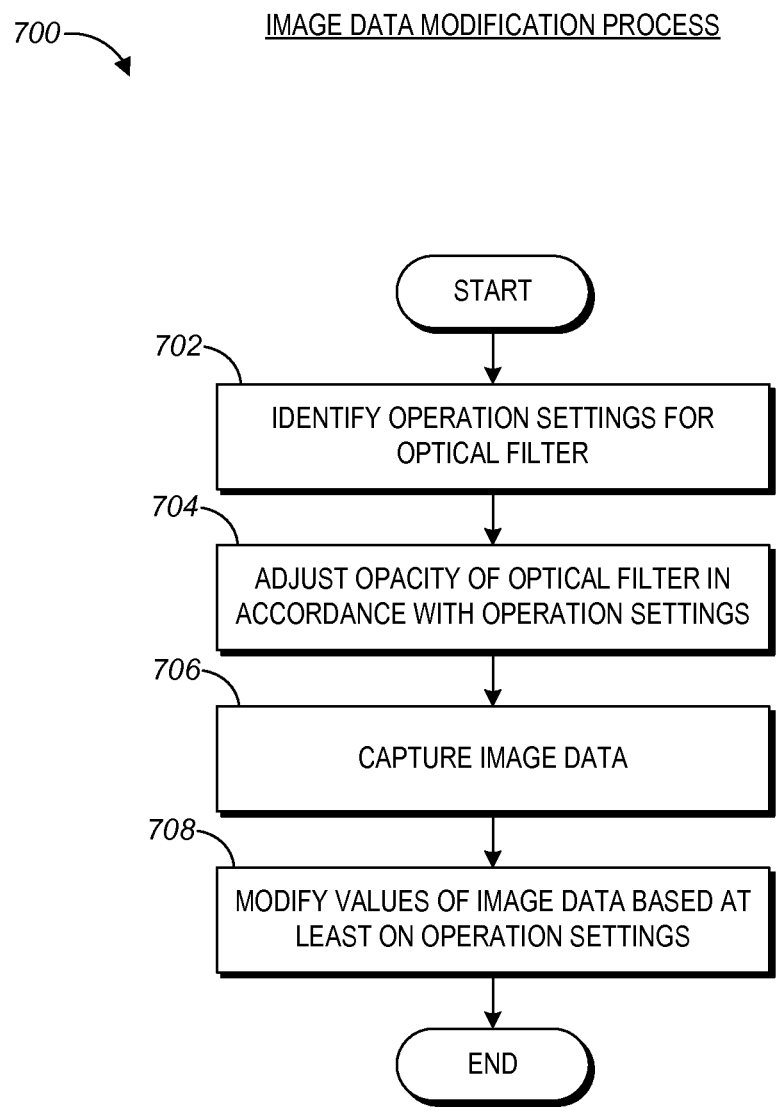
FIG. 7 illustrates an image data modification process performable by a camera system.

FIG. 7 illustrates an image data modification process 700 performable by a camera system, such as the camera system 100a or 100b. For convenience, the process 700 is described in the context of the camera system 100a but may instead be implemented by other systems described herein or other camera systems not shown. The process 700 provides one example approach by which the camera system 100a can counteract one or more different types of optical effects caused by the optical filter 102 on image data captured by the image sensor 114.

At block 702, the controller 116 can identify operation settings for the optical filter 102. For example, the controller 116 can identify a neutral density setting (e.g., a neutral density stop value) or an operating mode (e.g., a temporal filtering or global shuttering modes) for the optical filter 102. The operation settings may have been set based at least on a user input received by the controller 116 from a user interface (not shown).

At block 704, the controller 116 can adjust the opacity of the optical filter 102 in accordance with the operation settings for the optical filter 102. For instance, if the operation settings indicate that the optical filter 102 should have a neutral density stop value of 2.5, the controller 116 can supply a signal to the optical filter 102 to cause the optical filter 102 to provide the neutral density stop value of 2.5. In another example, if the operation settings indicate that the optical filter 102 should operate in a temporal filtering mode, the controller 116 can supply a signal to the optical filter 102 that causes the optical filter 102 to generate an exposure window function to provide a temporal filtering functionality.

At block 706, the image sensor 114 can capture image data. At block 708, the image processor 119 can modify values of the image data based at least on the operation settings for the optical filter 102. For example, the image processor 119 can modify the values based at least on the neutral density setting or operating mode for the optical filter 102. As a result, the image processor 119 can counteract one or more optical effects on the image data that are associated with the particular operation settings for the optical filter 102.

Camera System Schematics

Figure 4A:
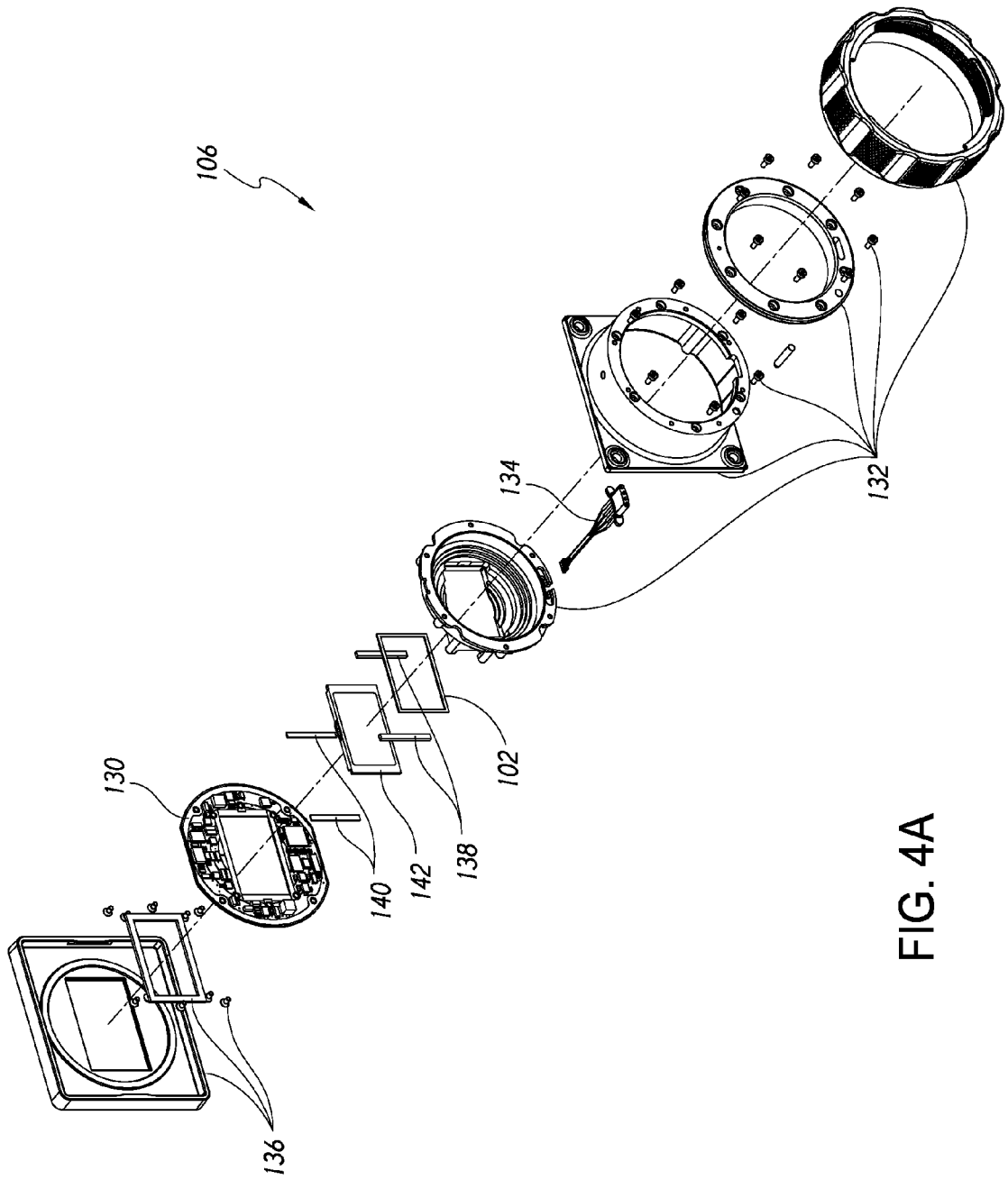
FIGS. 4A and 4B respectively illustrate front and back perspective exploded views of the lens mount of FIG. 3.
Figure 4B:
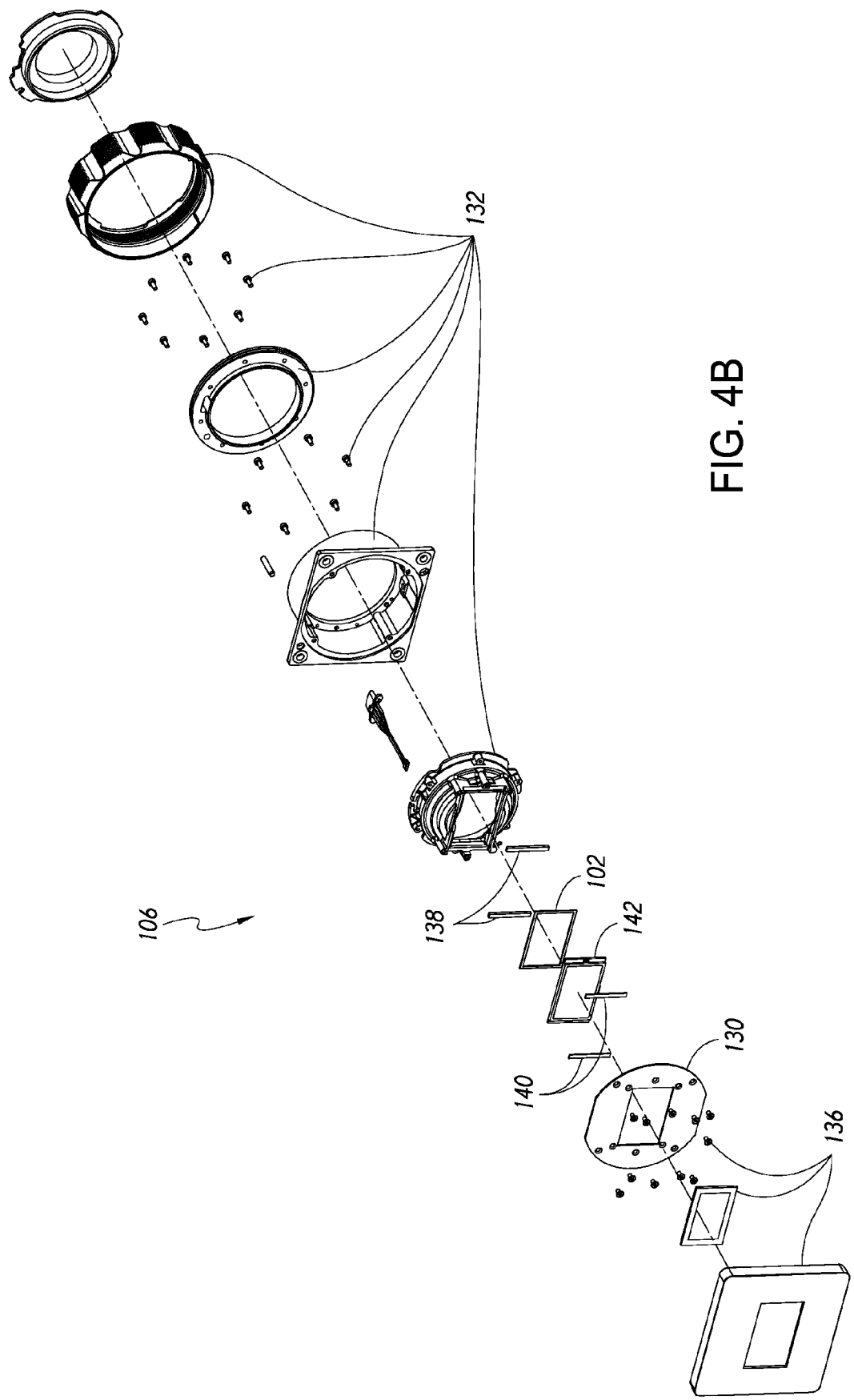

FIG. 3 shows a camera system 300 that includes a lens mount 106 having an integrated optical filter 102, a lens 108, and a camera housing 104. The camera system 300 can be an example implementation of the camera system 100a of FIG. 1A. The camera housing 104 has a housing aperture. The optical filter 102 can include an electronically-controlled panel, such as a liquid crystal panel. FIGS. 4A-B respectively illustrate front and back perspective exploded views of the lens mount 106 of FIG. 3. Referring to FIG. 4A, the lens mount 106 includes the optical filter 102, an electronics board 130, lens mounting components 132, an electrical connector 134, and camera mounting components 136.

The lens mounting components 132 generally work together to provide a mechanism for fastening the lens 108 to the lens mount 106, while the camera mounting components 132 provide mechanism for mounting the lens mount 106 to the camera housing 104.

The electronics board 130 includes electronics for controlling operation of the lens mount 106, the lens 108, and the optical filter 102. For instance, the electronics board 130 may include one or more application-specific integrated circuits (ASICs), field-programmable gate arrays (FPGAs), microprocessors, analog circuitry, and/or other custom circuitry, and the like. The electronics board 130 may comprise a printed circuit board, for example.

The electrical connector 134 electronically couples the camera housing 104 to one or more of the lens mount 106 (e.g., to the electronics board 130 of the lens mount 106) and the lens 108 in certain embodiments. FIG. 3 shows the electrical connector 134 installed in an assembled lens mount 106.

The optical filter 102 in the illustrated embodiment includes a rectangular, electronically-controllable, variable-opacity liquid crystal panel. A rectangular frame 142 holds the panel and defines a window (e.g., a hollow) for allowing the passage of light. A first set of contact strips 138 connect the optical filter 102 to the rear of one of the lens mounting components 132, while a second set of contact strips 140 connects the frame 140 to the electronics board 130. The first set of contact strips 138, the second set of contact strips 140, and the frame 142 are electrically conductive in one embodiment. Thus, drive signals from the electronics board 130 can be communicated to the liquid crystal panel via a signal path that is established from the electronics board 130 to the second set of contact strips 140, to the frame 142, to the first contact strips 138, and finally to electrodes on the periphery of the liquid crystal panel 102.

Referring again to FIG. 4A, one or more of the components in the lens mount 106 generally can define an optical path through which light passes to an image sensor. For instance, in the illustrated embodiment, each of the rear component of the lens mounting components 132, the optical filter 102, the frame 142, the electronics board 130, and the camera mount components 136 define substantially rectangular windows through which light can travel to the image sensor.

The optical filter 102 can have a certain index of refraction, and insertion of the optical filter 102 can therefore change the overall focal length of a camera system. In particular, this can alter the optical distance from an image sensor plane to the back of the lens 108. In order to compensate for this effect, the overall length of the lens mount 106 can be increased as compared to a lens mount 106 not having the optical filter 102. For instance, in one embodiment, the optical filter 102 includes a liquid crystal, and the length of the lens mount 106 can be greater by 0.898 millimeters as compared to a lens mount 106 not incorporating the optical filter 102 to compensate for the change in focal length due to the optical filter 102.

Position Control for Optical Filters

As discussed, it can be advantageous to move the optical filter 102 out of the optical path when not in use. FIGS. 5A-F illustrates an embodiment of a mechanism for achieving this. The mechanism includes an optical filter 102, a substitute optical element 152, and a pivot point 154. FIGS. 5A-F illus-trate a front, simplified view, looking at the mechanism from in front of the camera, where an image sensor may lie behind the mechanism.

The substitute optical element 154 can be made of a transmissive material (e.g., a glass panel) and can generally have the same shape and form factor as the optical filter 102. As discussed above, the optical filter 102 has a particular index of refraction, which affects the overall focal length of the camera system. Thus, removal of the optical filter 102 from the optical path will change the overall focal length of the camera system. In order to address this, the substitute optical element 154 can have the same or a substantially similar index of refraction as the optical filter 102. In this manner, the overall focal length of the camera system can remain constant or substantially constant, regardless of whether the optical filter 102 is in the optical path. In some other embodiments, a substitute optical element 154 is not used.

The mechanism can be included in a lens mount, for example, and the dashed lines 150 can represent the perimeter of the lens mount. For instance, the mechanism could be included in a lens mount, such as the lens mounts 106 of FIGS. 1A, 3, and 4A-B. In other embodiments, the mechanism may be provided in another location, such as within a camera housing.

Figure 5A:
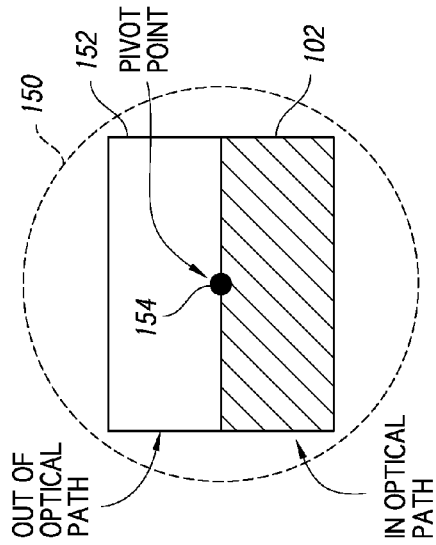
FIGS. 5A-F illustrate operation of an optical filter configured to move in and out of an optical path of a camera.
Figure 5B:
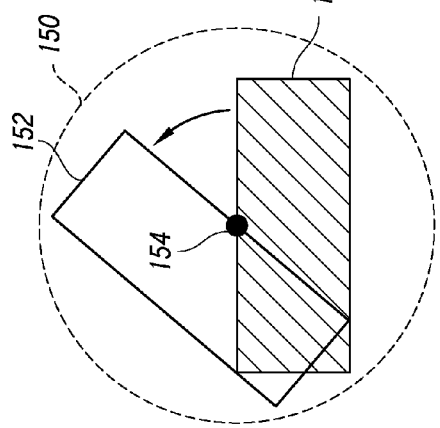
Figure 5C:
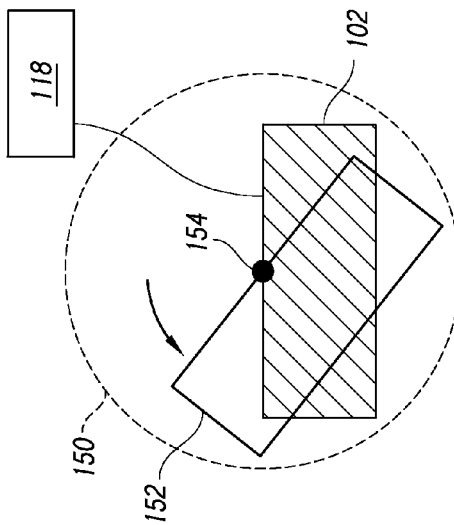
Figure 5D:
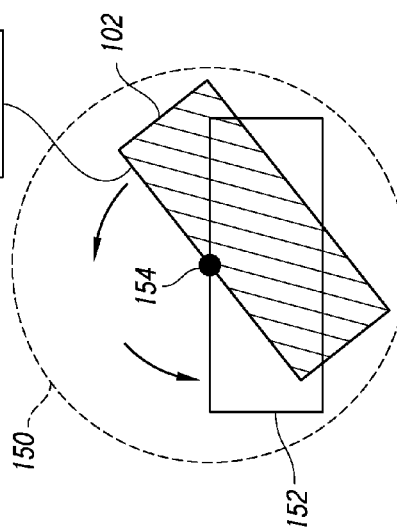
Figure 5E:
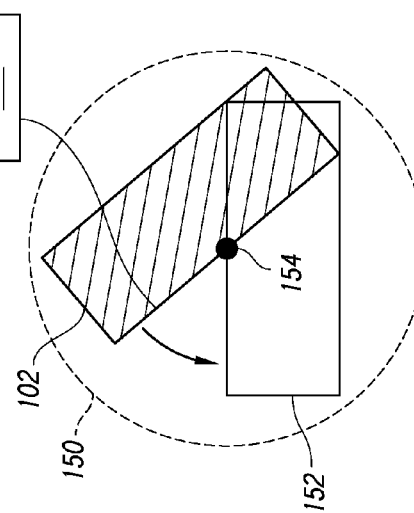
Figure 5F:
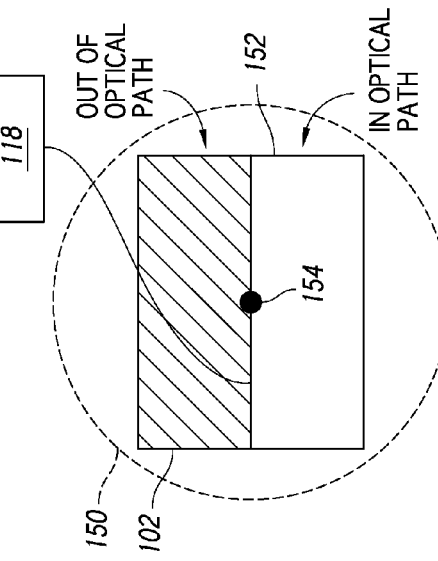

FIGS. 5A-F sequentially illustrate movement of the substitute optical element 152 into the optical path, and the optical filter 102 out of the optical path. For instance, FIGS. 5A-C show rotation of the substitute optical element 152 about the pivot point 154 and into the optical path, and FIGS. 5D-F show rotation of the optical filter 102 out of the optical path. As shown, the substitute optical element 152 and the optical filter 102 can generally swap positions in the illustrated embodiment, which can minimize the real estate and foot print required to house the mechanism.

While the movement of the substitute optical element 152 and the optical filter 102 is shown as two separate steps for the purposes of illustration, the movement of the substitute optical element 152 and optical filter 102 may occur simultaneously, or may at least partially overlap in time. Moreover, while not shown, when use of the optical filter 102 is desired, a similar process may be used to move the substitute optical element 152 back out of the optical path and to move the optical filter 102 back into the optical path. Or, the process shown in FIGS. 5A-F may be reversed to achieve this result, for example.

Actuation of the mechanism is achieved via a mechanical control in certain embodiments. For instance, a lever or knob mechanically coupled to the mechanism can be provided on the outside of the lens mount, camera body, or other component housing the mechanism. Actuation of the lever or knob results in movement of the optical filter 102 into and out of the optical path, as desired. In other embodiments, actuation of the mechanism is at least partially electronically or magnetically controlled, and can be initiated via user interaction with a GUI, button, or other camera control.

As shown, the optical filter 102 can be connected to a controller, which may be the lens mount controller 118 described above with respect to FIG. 1A, for example, and may include drive electronics for driving the optical filter 102. An electronic connector connects the lens mount controller 118 to the optical filter 102. The electronic connector can have at least one flexible portion. The electronic connector in some embodiments includes at least two electrical conductors, both of which are connected to both the lens mount controller 118 at one end and to the variable opacity optical filter 102 at the other end.

As shown in FIGS. 5C-F, because the connector can be flexible, it can bend or otherwise accommodate movement of the optical filter 102 into and out of the optical path. In some cases, it can be undesirable for components to move within the optical path of the system, e.g., to avoid contaminating the image sensor or to minimize disruption in image capture. As such, the connector can be arranged such that no portion of connector passes through the optical path as the variable opacity optical filter 102 moves into and out of the optical path. This is shown in FIG. 5C-F. To keep the connector out of the optical path when returning the optical filter 102 into the optical path, the mechanism can move the optical filter 102 out of the optical path by substantially reversing the movement shown in FIGS. 5C-F.

Other mechanisms are possible for managing electrical connectivity when the optical filter 102 is moved in and out of the optical path. For instance, instead of using a flexible connector, the optical filter 102 may move out of electrical and/or physical contact with control electronics when moved out of the optical path. As an example, referring to FIGS. 4A-B, the optical filter 102 can include a liquid crystal panel and be in communication with the electronics board 130 via the signal path established by the contacts 140, 138 and conducting frame 142. The liquid crystal panel 102 may be substantially irremovably coupled to one or more of the first set of contacts 138, the conducting frame 142, and the second set of contacts 140. When the optical filter 102 is moved out of the optical path, any components that are irremovably coupled to the optical filter 102 move along with the optical filter 102, out of the optical path. As such, the optical filter 102 and irremovably coupled components are temporarily electrically and physically decoupled from the electronics board 130 when it is out of the optical path. Conversely, when the optical filter 102 and any irremovably coupled components move back into the optical path, connectivity is re-established, e.g., via a friction fit.

In some other embodiments, two, three, four or more optical filters 102 (e.g., two or more liquid crystal display panels) can be used. In some such cases, at least one of the optical filters 102 can operate in a temporal mode simultaneously with at least another optical filter 102 operating in a neutral density mode or global shuttering mode, etc.

Figure 8:
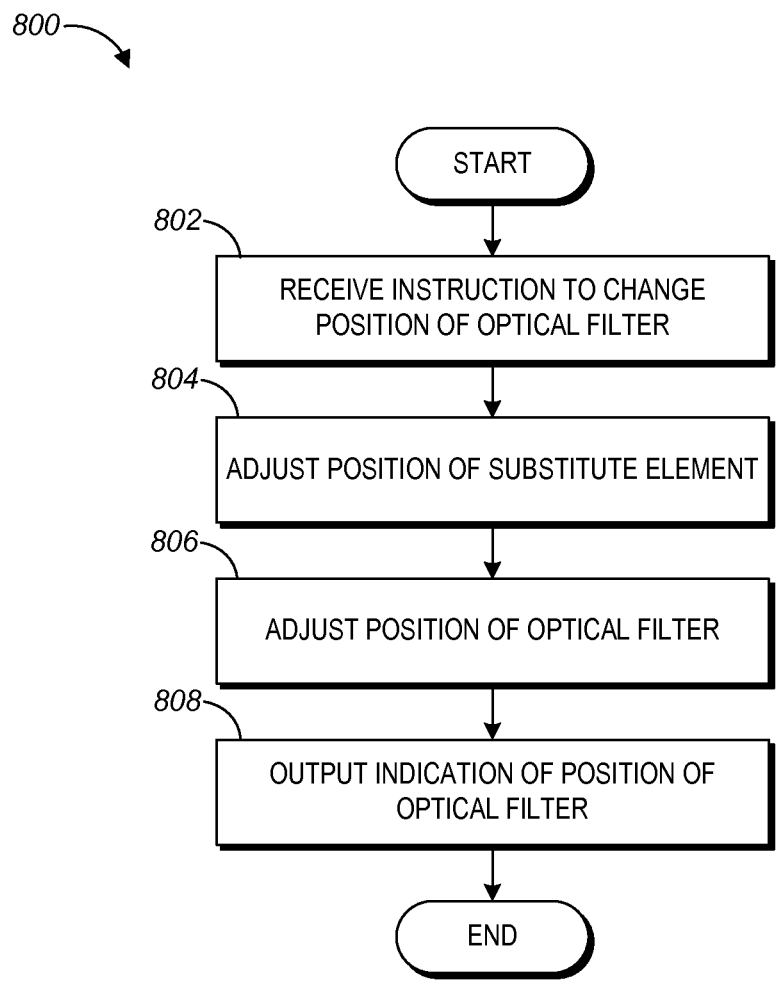
FIG. 8 illustrates an optical filter positioning process performable by a camera system.

FIG. 8 illustrates an optical filter positioning process 800 performable by a camera system, such as the camera system 100a or 100b. For convenience, the process 800 is described in the context of the camera system 100a and the mechanism of FIGS. 5A-F but may instead be implemented by other systems described herein or other camera systems not shown. The process 800 provides one example approach by which the camera system 100a can move the optical filter 102 into and out of the optical path of the image sensor 114, in conjunction with moving a substitute optical element into and out of the optical path.

At block 802, the controller 116 can receive an instruction to change the position of the optical filter 102. The instruction may be received by the controller 116 from a user interface (not shown), and the instruction can signify to move the optical filter 102 into the optical path of light entering the image sensor or to remove the optical filter 102 from the optical path.

At block 804, the controller 116 can adjust the position of the substitute element. For example, the controller 116 can provide a signal to the lens mount controller 118 to cause the substitute element to be moved or removed from the optical path in accordance with the instruction. In one implementation, during normal operation of the camera system 100a, the substitute element and optical filter 102 may be positioned opposite from one another as illustrated in FIGS. 5A and 5F. However, after the operation at block 804, the substitute element and optical filter 102 can be temporarily aligned with one another in or out of the optical path.

At block 806, the controller 116 can adjust the position of the optical filter 102. The controller 116 can, for instance, provide a signal to the lens mount controller 118 to cause the optical filter 102 to be moved or removed from the optical path in accordance with the instruction. After the operation at block 806, the substitute element and optical filter 102 may again be not aligned with one another in or out of the optical path.

At block 808, the controller 116 can output an indication of the position of the optical filter 102 for display to a user of the camera system 100a. For example, since the movement or position of the optical filter 102 and substitute element may not be readily visible to the user, the controller 116 can output an indication of the position of the optical filter 102 for display on the user interface used to receive the instruction.

Terminology and Other Variations

The preceding examples can be repeated with similar success by substituting generically or specifically described operating conditions of this disclosure for those used in the preceding examples.

Although the disclosure has been described in detail with particular reference to these preferred embodiments, other embodiments can achieve the same results. Variations and modifications of the present disclosure will be obvious to those skilled in the art and it is intended to cover all such modifications and equivalents.

Embodiments have been described in connection with the accompanying drawings. However, it should be understood that the figures are not drawn to scale. Distances, angles, etc. are merely illustrative and do not necessarily bear an exact relationship to actual dimensions and layout of the devices illustrated. In addition, the foregoing embodiments have been described at a level of detail to allow one of ordinary skill in the art to make and use the devices, systems, etc. described herein. A wide variety of variation is possible. Components, elements, and/or steps can be altered, added, removed, or rearranged. While certain embodiments have been explicitly described, other embodiments will become apparent to those of ordinary skill in the art based on this disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

Depending on the embodiment, certain acts, events, or functions of any of the methods described herein can be performed in a different sequence, can be added, merged, or left out altogether (e.g., not all described acts or events are necessary for the practice of the method). Moreover, in certain embodiments, acts or events can be performed concurrently, e.g., through multi-threaded processing, interrupt processing, or multiple processors or processor cores, rather than sequentially. In some embodiments, the algorithms disclosed herein can be implemented as routines stored in a memory device. Additionally, a processor can be configured to execute the routines. In some embodiments, custom circuitry may be used.

The various illustrative logical blocks, modules, circuits, and algorithm steps described in connection with the embodiments disclosed herein can be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

The blocks of the methods and algorithms described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, a hard disk, a removable disk, a CD-ROM, or any other form of computer-readable storage medium known in the art. An exemplary storage medium is coupled to a processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A camera, comprising:
   a camera housing;
   an image sensor within the camera housing and configured to convert light entering the camera housing into digital image data, the light passing through a variable opacity optical filter situated in the optical path prior to arriving at the image sensor; and
   a processor in communication with the image sensor and configured to:
   identify one or more operation settings for the optical filter,
   generate control information that operates the optical filter to cause an opacity level of the optical filter to adjust over an exposure period in accordance with the one or more operation settings for the optical filter, and
   modify values of the digital image data to counteract a white point shift or a color shift in the digital image data caused by the optical filter when the optical filter is operated in accordance with the one or more operation settings for the optical filter.

2. The camera of claim 1, wherein when the one or more operation settings for the optical filter indicate a temporal filtering mode, the processor is configured to generate the control information that operates the optical filter to cause the opacity level to adjust over the exposure period from a first opacity level to a second opacity level and back to the first opacity level, wherein the opacity level transitions through a plurality of intermediate opacity levels when adjusting between the first opacity level and the second opacity level and when adjusting between the second opacity level and the first opacity level.

3. The camera of claim 1, wherein the one or more operation settings for the optical filter include a neutral density setting, and the processor is configured to generate the control information that operates the optical filter to cause the optical filter to maintain the opacity level over the exposure period at a first opacity level corresponding to the neutral density setting.

4. The camera of claim 1, wherein the processor is configured to modify the values of the digital image data by applying a matrix to the digital image data.

5. The camera of claim 4, wherein the processor is configured to apply the matrix to the digital image data to at least perform colorimetry calibration associated with one or more components other than the optical filter.

6. The camera of claim 1, wherein the digital image data comprises first, second, and third colors, and the processor is configured to modify the values of the digital image data by modifying values of the first color a greater amount than values of the second color.

7. The camera of claim 6, wherein the first color comprises blue image data.

8. The camera of claim 6, wherein the processor is configured to modify the values of the first color by reducing the values of the first color (i) a first amount when the optical filter is operated so that the opacity level is at a first level and (ii) a second amount when the optical filter is operated so that the opacity level is at a second level different from the first level, the first amount being greater than the second amount.

9. The camera of claim 1, wherein the processor is configured to modify the values of the digital image data by modifying the digital image data in accordance with a first function to counteract a white point shift in the digital image data caused by the optical filter when the optical filter is operated in accordance with the one or more operation settings for the optical filter before modifying the digital image data in accordance with a second function to counteract a color shift in the digital image data caused by the optical filter when the optical filter is operated in accordance with the one or more operation settings for the optical filter.

10. The camera of claim 1, wherein the processor is configured to modify the values of the digital image data by reducing the values of the digital image data (i) a first amount when the one or more operation settings for the optical filter indicate a temporal filtering mode and (ii) a second amount when the one or more operation settings for the optical filter indicate a global shuttering mode, the first amount being greater than the second amount.

11. The camera of claim 1, wherein when the one or more operation settings for the optical filter indicate a temporal filtering mode, the processor is configured to modify the values of the digital image data based at least on a shutter angle associated with the optical filter.

12. The camera of claim 1, wherein the processor is configured to set the one or more operation settings for the optical filter at least in part according to a user input.

13. The camera of claim 1, wherein the optical filter is included in a lens mount removably attached to the camera housing.

14. The camera of claim 1, further comprising the optical filter, which is contained within the camera housing.

15. The camera of claim 1, wherein the optical filter comprises a liquid crystal panel.

16. The camera of claim 1, wherein the processor is configured to generate the control information so as to operate the optical filter in at least three different modes corresponding to:
 a temporal filtering mode in which the optical filter gradually increases its transmissivity to a first level, and subsequently gradually decreases the transmissivity from the first level before the end of the exposure period;
 a global shutter mode wherein the optical filter (a) maintains a first level of transmissivity, (b) abruptly increases transmissivity from the first level to a second level, (c) maintains the second level of transmissivity, and (d) abruptly decreases transmissivity from the second level; and
 a neutral density mode wherein the opacity is maintained at a constant value over the exposure period.

17. The camera of claim 1, wherein the processor is configured to modify the values of the digital image data to counteract a white point shift in the digital image data caused by the optical filter when the optical filter is operated in accordance with the one or more operation settings for the optical filter.

18. The camera of claim 1, wherein the processor is configured to modify the values of the digital image data to counteract a color shift in the digital image data caused by the optical filter when the optical filter is operated in accordance with the one or more operation settings for the optical filter.

19. A method of operating a camera, comprising:
 identifying one or more operation settings for an optical filter having a variable opacity;
 adjusting, with a processor, an opacity level of the optical filter over an exposure period in accordance with the one or more operation settings for the optical filter;
 converting, with an image sensor within a camera housing, light entering the camera housing into digital image data, wherein the light passes through the optical filter prior to arriving at the image sensor; and
 modifying values of the digital image data to counteract a white point shift or a color shift in the digital image data caused by the optical filter when the optical filter is adjusted in accordance with the one or more operation settings for the optical filter.

20. The method of claim 19, wherein the one or more operation settings for the optical filter include a neutral density setting, and said adjusting comprises maintaining the opacity level over the exposure period at a level that corresponds to the neutral density setting.

21. The method of claim 19, wherein said modifying comprises applying a matrix to the digital image data.

22. The method of claim 19, wherein said modifying comprises modifying the digital image data in accordance with a first function to counteract a white point shift in the digital image data caused by the optical filter when the optical filter is adjusted in accordance with the one or more operation settings for the optical filter before modifying the digital image data in accordance with a second function to counteract a color shift in the digital image data caused by the optical filter when the optical filter is adjusted in accordance with the one or more operation settings for the optical filter.

23. The method of claim 19, wherein said modifying comprises reducing the values of the digital image data (i) a first amount when the one or more operation settings for the optical filter indicate a temporal filtering mode and (ii) a second amount when the one or more operation settings for the optical filter indicate a global shuttering mode, the first amount being greater than the second amount.

24. The method of claim 19, wherein said modifying comprises modifying the values of the digital image data to counteract a white point shift in the digital image data caused by the optical filter when the optical filter is adjusted in accordance with the one or more operation settings for the optical filter.

25. A camera, comprising:
 a camera housing;
 an image sensor within the camera housing and configured to convert light entering the camera housing into digital motion picture image data, the light passing through a variable opacity optical filter situated in the optical path prior to arriving at the image sensor; and
 a processor in communication with the image sensor and configured to:
  receive an indication of a user-selected operational mode for the optical filter, the operational mode selected from at least two available operational modes including a temporal filtering mode and a global shutter mode;
  for each image frame of a plurality of image frames represented by the digital motion picture image data, over an exposure period corresponding to at least a portion of a frame period corresponding to the image frame:
   if the user-selected operational mode is the temporal filtering mode, generate control information that operates the optical filter to cause the optical filter to gradually increase its transmissivity to a first level, and to subsequently gradually decrease the transmissivity from the first level before the end of the exposure period; and if the user-selected operational mode is the global shutter mode, generate control information that operates the optical filter to cause the optical filter to: (a) maintain a first level of transmissivity; (b) abruptly increase transmissivity from the first level to a second level; (c) maintain the second level of transmissivity; and (d) abruptly decrease transmissivity from the second level; and modify values of the digital motion picture image data to counteract a white point shift or a color shift in the digital motion picture image data caused by the optical filter, wherein the processor is configured to modify the values of the digital motion picture image data differently when the user-selected operational mode is the temporal filtering mode than when the user-selected operational mode is the global shutter mode.

26. The camera of claim 25, wherein the at least two available operational modes further includes a neutral density mode, and the processor is further configured, if the user-selected operational mode is the neutral density mode, generate the control information that operates the optical filter to cause the optical filter to maintain a substantially constant level of transmissivity over the exposure period, the processor being configured to modify the values of the digital motion picture image data differently when the user-selected operational mode is the neutral density mode than when the user-selected operational mode is the temporal filtering mode or the global shutter mode.

27. The method of claim 19, wherein said modifying comprises modifying the values of the digital image data to counteract a color shift in the digital image data caused by the optical filter when the optical filter is adjusted in accordance with the one or more operation settings for the optical filter.

* * * * *